(12) United States Patent
Chen et al.

(10) Patent No.: US 10,409,033 B2
(45) Date of Patent: Sep. 10, 2019

(54) LENS ASSEMBLY

(71) Applicants: Sintai Optical (Shenzhen) Co., Ltd., ShenZhen, Guandong Province (CN); Asia Optical Co., Inc., Taichung (TW)

(72) Inventors: Chien-Hung Chen, Taichung (TW); Hsi-Ling Chang, Taichung (TW)

(73) Assignees: SINTAI OPTICAL (SHENZHEN) CO., LTD., Shenzhen (CN); ASIA OPTICAL CO., INC., Taichung (TW)

(*) Notice: Subject to any disclaimer, the term of this patent is extended or adjusted under 35 U.S.C. 154(b) by 0 days.

(21) Appl. No.: 15/822,422

(22) Filed: Nov. 27, 2017

(65) Prior Publication Data

US 2019/0072745 A1 Mar. 7, 2019

(30) Foreign Application Priority Data

Sep. 6, 2017 (CN) .......................... 2017 1 0797110

(51) Int. Cl.
| | |
|---|---|
| *G02B 3/02* | (2006.01) |
| *G02B 9/34* | (2006.01) |
| *G02B 13/00* | (2006.01) |
| *G02B 9/60* | (2006.01) |

(52) U.S. Cl.
CPC ................. *G02B 9/34* (2013.01); *G02B 9/60* (2013.01); *G02B 13/004* (2013.01)

(58) Field of Classification Search
CPC ........................................................ G02B 9/34
USPC ......................................................... 359/714
See application file for complete search history.

(56) References Cited

U.S. PATENT DOCUMENTS

| | | | |
|---|---|---|---|
| 9,933,602 B1* | 4/2018 | Li ........................ | G02B 13/002 |
| 2012/0194920 A1* | 8/2012 | Huang ................ | G02B 13/0045 |
| | | | 359/714 |
| 2016/0011398 A1* | 1/2016 | Tsai .................... | G02B 13/0045 |
| | | | 359/714 |

* cited by examiner

*Primary Examiner* — James C. Jones
(74) *Attorney, Agent, or Firm* — McClure, Qualey, & Rodack, LLP

(57) ABSTRACT

A lens assembly includes a first lens, a second lens, a third lens, and a fourth lens, wherein the first lens, the second lens, the third lens, and the fourth lens are arranged in order from an object side to an image side along an optical axis. The first lens is with positive refractive power. The second lens is with negative refractive power. The third lens is with refractive power. The fourth lens is with negative refractive power. The lens assembly satisfies: $0.2<D_4/TTL<0.6$, wherein $D_4$ is an effective diameter of the fourth lens and TTL is an interval from an object side surface of the first lens to an image plane along the optical axis.

20 Claims, 22 Drawing Sheets

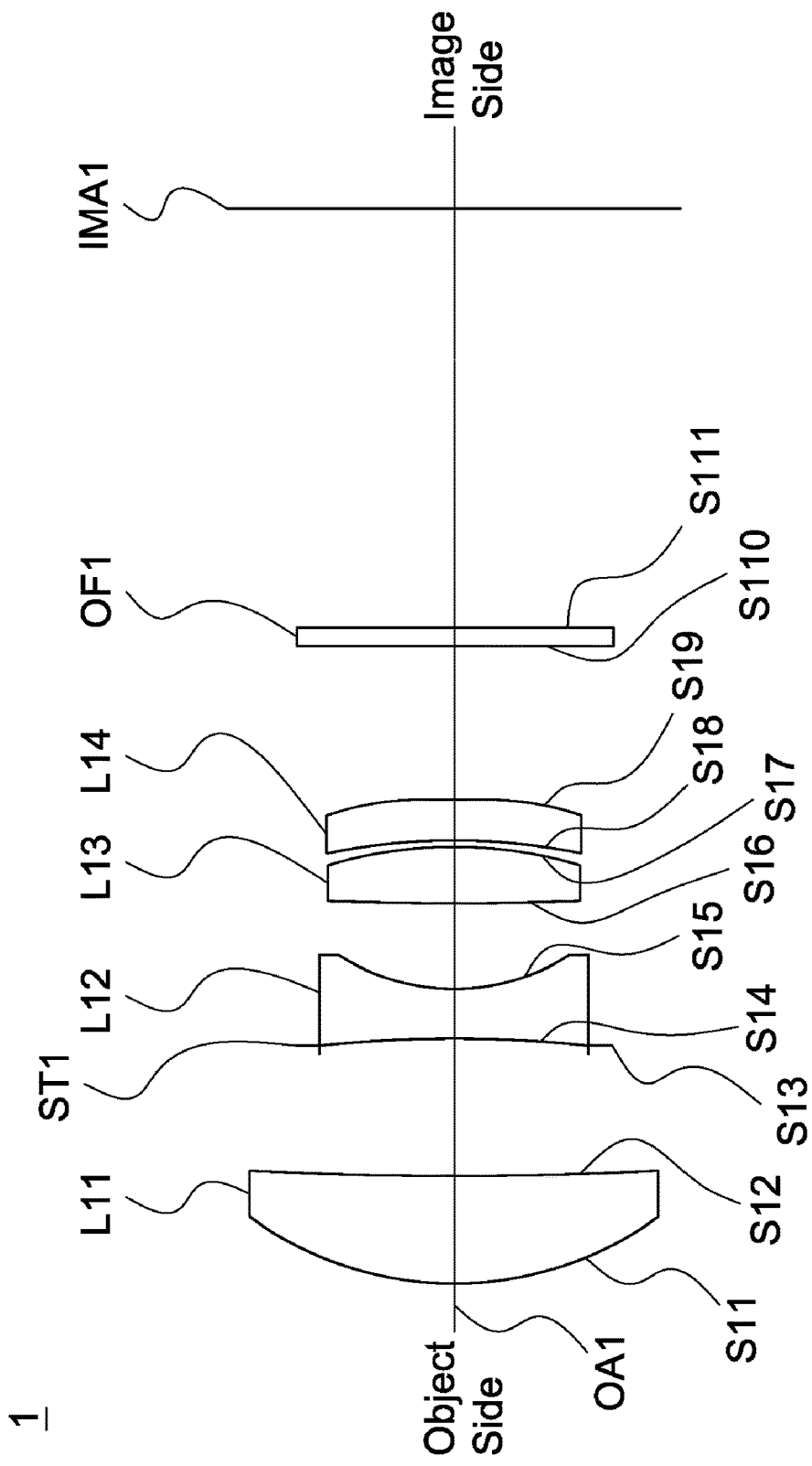

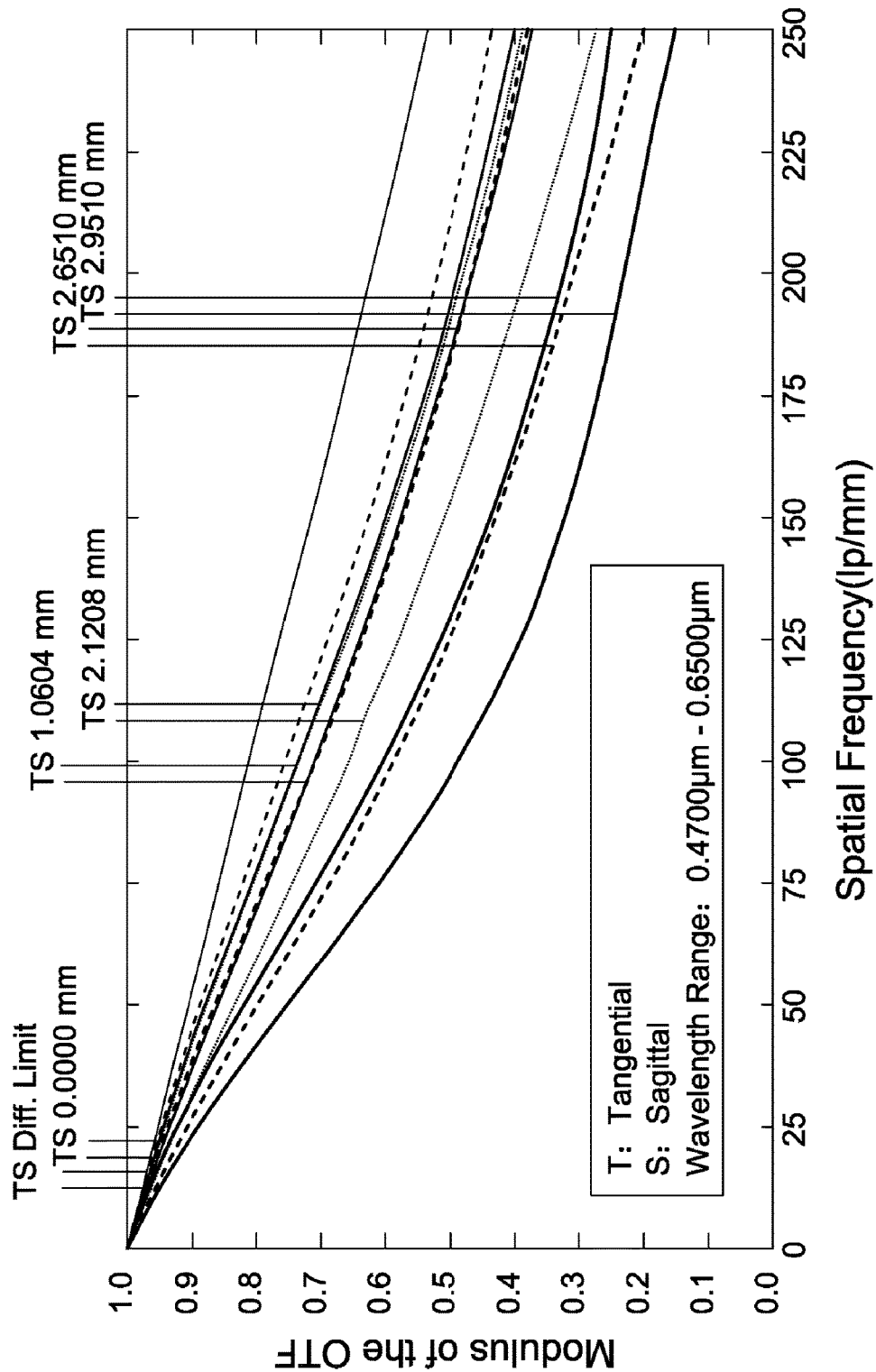

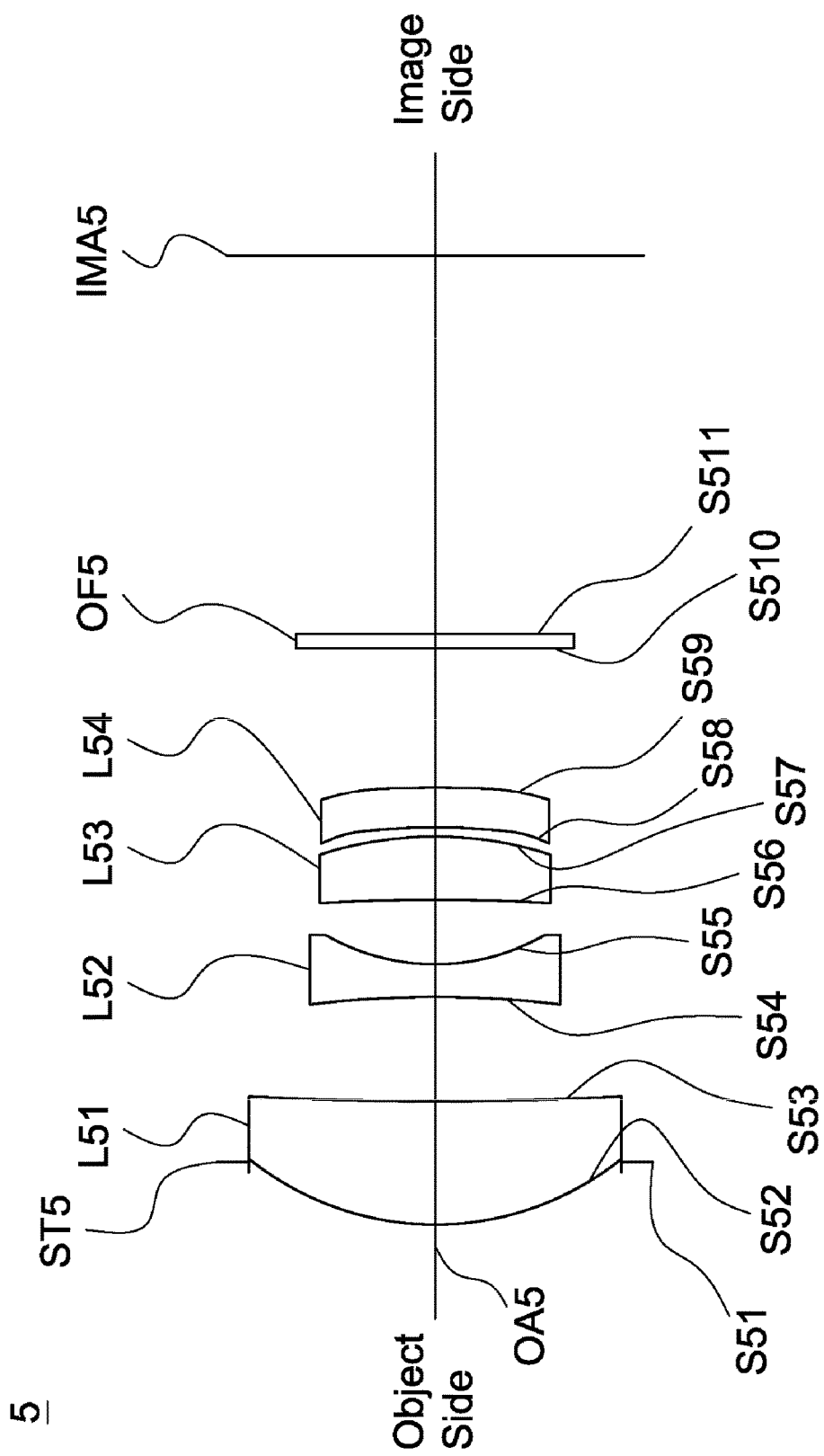

_US 10,409,033 B2_

LENS ASSEMBLY

BACKGROUND OF THE INVENTION

Field of the Invention

The invention relates to a lens assembly.

Description of the Related Art

Nowadays, the development trend of a lens assembly is continuously toward miniaturization and high resolution. However, the known lens assembly can't satisfy such requirements. Therefore, the lens assembly needs a new structure in order to meet the requirements of miniaturization and high resolution at the same time.

BRIEF SUMMARY OF THE INVENTION

The invention provides a lens assembly to solve the above problems. The lens assembly of the invention is provided with characteristics of a shortened total lens length, a higher resolution, and still has a good optical performance.

The lens assembly in accordance with an exemplary embodiment of the invention includes a first lens, a second lens, a third lens, and a fourth lens, wherein the first lens, the second lens, the third lens, and the fourth lens are arranged in order from an object side to an image side along an optical axis. The first lens is with positive refractive power. The second lens is with negative refractive power. The third lens is with refractive power. The fourth lens is with negative refractive power. The lens assembly satisfies: $0.2<D_4/TTL<0.6$, wherein $D_4$ is an effective diameter of the fourth lens and TTL is an interval from an object side surface of the first lens to an image plane along the optical axis.

In another exemplary embodiment, the lens assembly further includes a fifth lens disposed between the third lens and the fourth lens, wherein the fifth lens is with positive refractive power.

In yet another exemplary embodiment, the lens assembly satisfies: $f_{234}<0$, wherein $f_{234}$ is an effective focal length of a combination of the second lens, the third lens, and the fourth lens.

In another exemplary embodiment, the lens assembly satisfies: $TC_{34}<TTL/5$, wherein $TC_{34}$ is an air interval from an image side surface of the third lens to an object side surface of the fourth lens along the optical axis and TTL is an interval from an object side surface of the first lens to an image plane along the optical axis.

In yet another exemplary embodiment, the lens assembly satisfies: $R_{41}/R_{11}<0$, wherein $R_{11}$ is a radius of curvature of an object side surface of the first lens and $R_{41}$ is a radius of curvature of an object side surface of the fourth lens.

In another exemplary embodiment, the lens assembly satisfies: $(f_1+f_3)/f_2<0$, wherein $f_1$ is an effective focal length of the first lens, $f_2$ is an effective focal length of the second lens, and $f_3$ is an effective focal length of the third lens.

In yet another exemplary embodiment, the lens assembly satisfies: $TC_{23}<TTL/5$, wherein $TC_{23}$ is an air interval from an image side surface of the second lens to an object side surface of the third lens along the optical axis and TTL is an interval from an object side surface of the first lens to an image plane along the optical axis.

In another exemplary embodiment, the lens assembly further includes a stop disposed between the object side and the second lens, wherein the lens assembly satisfies: $0.6<SL/TTL<1.1$, wherein SL is an interval from the stop to an image plane along the optical axis and TTL is an interval from an object side surface of the first lens to the image plane along the optical axis.

In yet another exemplary embodiment, the lens assembly further includes a non-circular stop, wherein the non-circular stop includes an outer circumferential portion and an inner circumferential portion, at least one of the outer circumferential portion and the inner circumferential portion is non-circular, the inner circumferential portion surrounds the optical axis to form a hole, and the non-circular stop satisfies: $1<Dx/Dy<28$, wherein Dx is a maximum dimension of the hole through which the optical axis passes and Dy is a minimum dimension of the hole through which the optical axis passes.

In another exemplary embodiment, the lens assembly satisfies: $f_{2354}<0$, wherein $f_{2354}$ is an effective focal length of a combination of the second lens, the third lens, the fifth lens, and the fourth lens.

In yet another exemplary embodiment, the lens assembly satisfies: $0.07<(TC_{12}+TC_{23})/TTL<0.25$, wherein $TC_{12}$ is an air interval from an image side surface of the first lens to an object side surface of the second lens along the optical axis, $TC_{23}$ is an air interval from an image side surface of the second lens to an object side surface of the third lens along the optical axis, and TTL is an interval from an object side surface of the first lens to an image plane along the optical axis.

The lens assembly in accordance with an exemplary embodiment of the invention includes a first lens, a second lens, a third lens, and a fourth lens, wherein the first lens, the second lens, the third lens, and the fourth lens are arranged in order from an object side to an image side along an optical axis. The first lens is with positive refractive power. The second lens is with negative refractive power. The third lens is with refractive power. The fourth lens is with negative refractive power. The lens assembly satisfies: $1<f/TTL<1.5$, wherein f is an effective focal length of the lens assembly and TTL is an interval from an object side surface of the first lens to an image plane along the optical axis.

In another exemplary embodiment, the lens assembly further includes a fifth lens disposed between the third lens and the fourth lens, wherein the fifth lens is with positive refractive power.

In yet another exemplary embodiment, the lens assembly satisfies: $f_{234}<0$, wherein $f_{234}$ is an effective focal length of a combination of the second lens, the third lens, and the fourth lens.

In another exemplary embodiment, the lens assembly satisfies: $TC_{34}<TTL/5$, wherein $TC_{34}$ is an air interval from an image side surface of the third lens to an object side surface of the fourth lens along the optical axis and TTL is an interval from an object side surface of the first lens to an image plane along the optical axis.

In yet another exemplary embodiment, the lens assembly satisfies: $R_{41}/R_{11}<0$, wherein $R_{11}$ is a radius of curvature of an object side surface of the first lens and $R_{41}$ is a radius of curvature of an object side surface of the fourth lens.

In another exemplary embodiment, the lens assembly satisfies: $(f_1+f_3)/f_2<0$, wherein $f_1$ is an effective focal length of the first lens, $f_2$ is an effective focal length of the second lens, and $f_3$ is an effective focal length of the third lens.

In yet another exemplary embodiment, the lens assembly further includes a stop disposed between the object side and the second lens, wherein the lens assembly satisfies: $0.6<SL/TTL<1.1$, wherein SL is an interval from the stop to an image plane along the optical axis and TTL is an interval from an object side surface of the first lens to the image plane along the optical axis.

In another exemplary embodiment, the lens assembly further includes a non-circular stop, wherein the non-circular stop includes an outer circumferential portion and an inner circumferential portion, at least one of the outer circumferential portion and the inner circumferential portion is non-circular, the inner circumferential portion surrounds the optical axis to form a hole, and the non-circular stop satisfies: 1<Dx/Dy<28, wherein Dx is a maximum dimension of the hole through which the optical axis passes and Dy is a minimum dimension of the hole through which the optical axis passes.

In yet another exemplary embodiment, the lens assembly satisfies: $0.07<(TC_{12}+TC_{23})/TTL<0.25$, wherein $TC_{12}$ is an air interval from an image side surface of the first lens to an object side surface of the second lens along the optical axis, $TC_{23}$ is an air interval from an image side surface of the second lens to an object side surface of the third lens along the optical axis, and TTL is an interval from an object side surface of the first lens to an image plane along the optical axis.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 1 is a lens layout diagram of a lens assembly in accordance with a first embodiment of the invention;

FIG. 2C is a modulation transfer function diagram of the lens assembly in accordance with the first embodiment of the invention;

FIG. 3 is a lens layout diagram of a lens assembly in accordance with a third embodiment of the invention;

DETAILED DESCRIPTION OF THE INVENTION

Figure 2A:
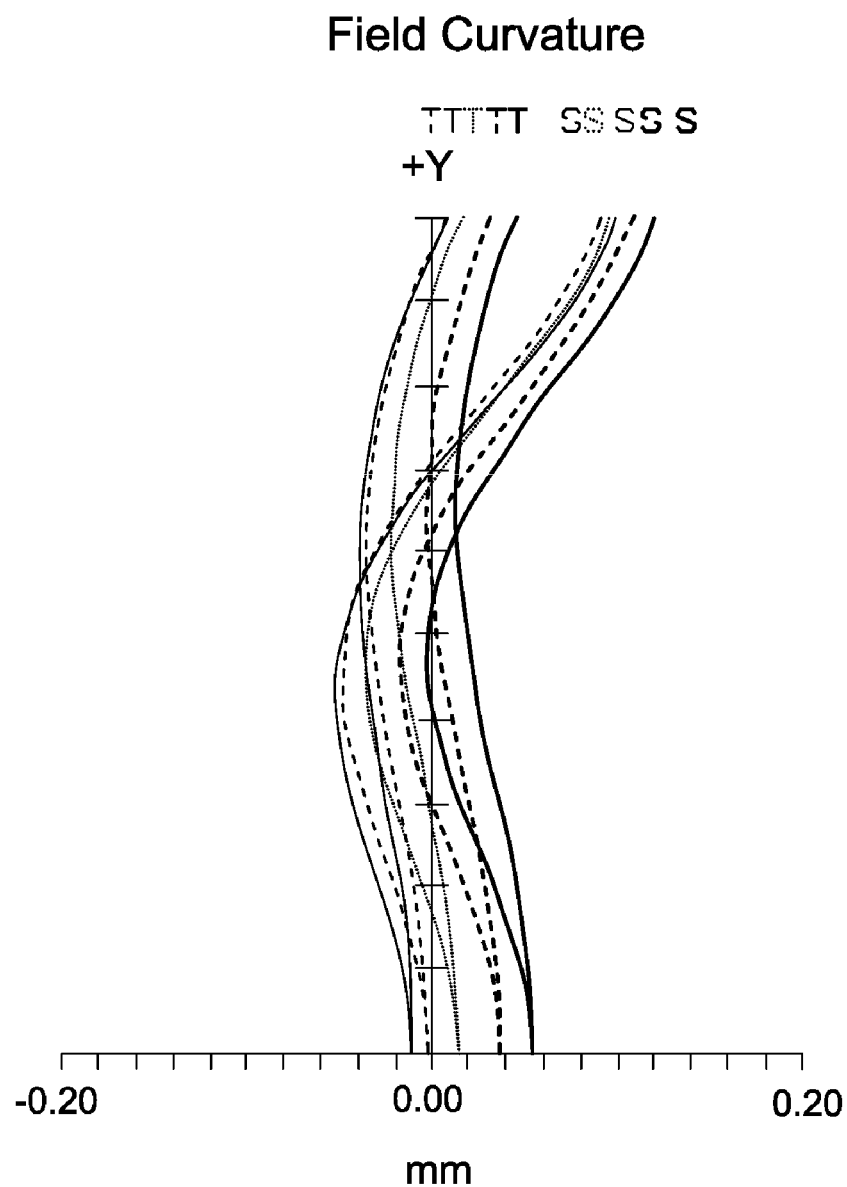
FIG. 2A depicts a field curvature diagram of the lens assembly in accordance with the first embodiment of the invention.

The following description is made for the purpose of illustrating the general principles of the invention and should not be taken in a limiting sense. The scope of the invention is best determined by reference to the appended claims.

Referring to FIG. 1, FIG. 1 is a lens layout diagram of a lens assembly in accordance with a first embodiment of the invention. The lens assembly 1 includes a first lens L11, a stop ST1, a second lens L12, a third lens L13, a fourth lens L14, and an optical filter OF1, all of which are arranged in order from an object side to an image side along an optical axis OA1. In operation, an image of light rays from the object side is formed at an image plane IMA1.

The first lens L11 is a meniscus lens with positive refractive power and made of glass material, wherein the object side surface S11 is a convex surface, the image side surface S12 is a concave surface, and both of the object side surface S11 and image side surface S12 are aspheric surfaces.

The second lens L12 is a biconcave lens with negative refractive power and made of glass material, wherein the object side surface S14 is a concave surface, the image side surface S15 is a concave surface, and both of the object side surface S14 and image side surface S15 are aspheric surfaces.

The third lens L13 is a biconvex lens with positive refractive power and made of glass material, wherein the object side surface S16 is a convex surface, the image side surface S17 is a convex surface, and both of the object side surface S16 and image side surface S17 are aspheric surfaces.

The fourth lens L14 is a meniscus lens with negative refractive power and made of glass material, wherein the object side surface S18 is a concave surface, the image side surface S19 is a convex surface, and both of the object side surface S18 and image side surface S19 are aspheric surfaces.

Both of the object side surface S110 and image side surface S111 of the optical filter OF1 are plane surfaces.

In order to maintain excellent optical performance of the lens assembly in accordance with the first embodiment of the invention, the lens assembly 1 satisfies at least one of the following conditions:

$$R1_{41}/R1_{11}<0 \tag{1}$$

$$(f1_1+f1_3)/f1_2<0 \tag{2}$$

$$f1_{234}<0 \tag{3}$$

$$TC1_{23}<TTL1/5 \tag{4}$$

$$TC1_{34}<TTL1/5 \tag{5}$$

$0.6 < SL1/TTL1 < 1.1$ \hfill (6)

$0.2 < D1_4/TTL1 < 0.6$ \hfill (7)

$1 < f1/TTL1 < 1.5$ \hfill (8)

$0.07 < (TC1_{12}+TC1_{23})/TTL1 < 0.25$ \hfill (9)

wherein $R1_{11}$ is a radius of curvature of the object side surface S11 of the first lens L11, $R1_{41}$ is a radius of curvature of the object side surface S18 of the fourth lens L14, $f1_1$ is an effective focal length of the first lens L11, $f1_2$ is an effective focal length of the second lens L12, $f1_3$ is an effective focal length of the third lens L13, $f1_{234}$ is an effective focal length of a combination of the second lens L12, the third lens L13, and the fourth lens L14, $TC1_{23}$ is an air interval from the image side surface S15 of the second lens L12 to the object side surface S16 of the third lens L13 along the optical axis OA1, TTL1 is an interval from the object surface S11 of the first lens L11 to the image plane IMA1 along the optical axis OA1, $TC1_{34}$ is an air interval from the image side surface S17 of the third lens L13 to the object side surface S18 of the fourth lens L14 along the optical axis OA1, SL1 is an interval from the stop ST1 to the image plane IMA1 along the optical axis OA1, $D1_4$ is an effective diameter of the fourth lens L14, f1 is an effective focal length of the lens assembly 1, and $TC1_{12}$ is an air interval from the image side surface S12 of the first lens L11 to the object side surface S14 of the second lens L12 along the optical axis OA1.

By the above design of the lenses, stop ST1, and satisfies at least one of the conditions (1)-(9), the lens assembly 1 is provided with an effective shortened total lens length, an effective corrected aberration, and an increased resolution.

In order to achieve the above purposes and effectively enhance the optical performance, the lens assembly 1 in accordance with the first embodiment of the invention is provided with the optical specifications shown in Table 1, which include the effective focal length, F-number, total lens length, field of view, radius of curvature of each lens surface, thickness between adjacent surface, refractive index of each lens and Abbe number of each lens. Table 1 shows that the effective focal length is equal to 14.045 mm, F-number is equal to 2.6, total lens length is equal to 13.955356 mm, and field of view is equal to 23.6 degrees for the lens assembly 1 of the first embodiment of the invention.

TABLE 1

| Surface Number | Radius of Curvature (mm) | Thickness (mm) | Nd | Vd | Remark |
|---|---|---|---|---|---|
| S11 | 4.514456 | 1.4 | 1.68548 | 54.62 | The First Lens L11 |
| S12 | 126.9456 | 1.668051 | | | |
| S13 | ∞ | 0.089087 | | | Stop ST1 |
| S14 | −12.9149 | 0.662846 | 1.651 | 21.5 | The Second Lens L12 |
| S15 | 3.260705 | 1.092547 | | | |
| S16 | 37.36509 | 0.738925 | 1.651 | 21.5 | The Third Lens L13 |
| S17 | −5.7106 | 0.074078 | | | |
| S18 | −9.86799 | 0.558355 | 1.535037 | 55.71072 | The Fourth Lens L14 |
| S19 | −11.2443 | 2 | | | |
| S110 | ∞ | 0.21 | 1.5168 | 64.16734 | Optical Filter OF1 |
| S111 | ∞ | 5.461467 | | | |

Effective Focal Length = 14.045 mm
F-number = 2.6
Total Lens Length = 13.955356 mm
Field of View = 23.6 Degrees The aspheric surface sag z of each lens in table 1 can be calculated by the following formula:

$$z = ch^2/\{1+[1-(k+1)c^2h^2]^{1/2}\} \pm Ah^4 + Bh^6 + Ch^8 + Dh^{10} + Eh^{12} \pm Fh^{14} \pm Gh^{16}$$

where c is curvature, h is the vertical distance from the lens surface to the optical axis, k is conic constant and A, B, C, D, E, F and G are aspheric coefficients.

In the first embodiment, the conic constant k and the aspheric coefficients A, B, C, D, E, F, G of each surface are shown in Table 2.

TABLE 2

| Surface Number | k | A | B | C |
|---|---|---|---|---|
| S11 | −0.16058 | 1.48184E−05 | 1.25024E−05 | −7.21425E−06 |
| S12 | 0 | 0.000628514 | −5.17004E−05 | 1.62318E−06 |
| S14 | 0 | 0.004970424 | 0.000688664 | −0.000213003 |
| S15 | 0.691585 | 0.00068844 | 0.002133565 | 0.000612252 |
| S16 | −1632.35 | −0.003186897 | 0.000225961 | 0.000351689 |
| S17 | −4.54533 | 0.000221172 | −0.00188799 | 0.000233386 |
| S18 | −122.967 | −0.01229807 | 0.001693026 | −0.000440103 |
| S19 | 24.87297 | −0.007353559 | 0.000926213 | −0.000547905 |

TABLE 2-continued

| Surface Number | D | E | F | G |
|---|---|---|---|---|
| S11 | 4.80393E−07 | 2.99651E−08 | 9.85104E−09 | −2.02739E−09 |
| S12 | −1.26165E−07 | 4.19885E−07 | −8.81178E−08 | 3.92209E−09 |
| S14 | −1.11362E−05 | 1.90848E−06 | 6.6-783E−07 | −1.39555E−07 |
| S15 | −0.000395106 | −1.96237E−05 | 4.13973E−05 | −9.556E−06 |
| S16 | −1.37555E−05 | −1.80737E−05 | −4.22365E−06 | 4.48488E−07 |
| S17 | 0.00010036 | −3.037E−05 | −9.06357E−06 | 5.22979E−06 |
| S18 | −0.000256405 | 5.40328E−05 | 2.76221E−05 | −2.35622E−06 |
| S19 | 8.11967E−05 | 3.34197E−06 | 1.89682E−06 | 1.64176E−07 |

Table 3 shows the parameters and condition values for conditions (1)-(9). As can be seen from Table 3, the lens assembly 1 of the first embodiment satisfies the conditions (1)-(9).

TABLE 3

| | | | | | |
|---|---|---|---|---|---|
| $R1_{11}$ | 4.514456 mm | $R1_{41}$ | −9.86799 mm | $fl_1$ | 1.271 mm |
| $fl_2$ | −1.0891 mm | $fl_3$ | 2.3233 mm | $fl_{234}$ | −12.619 mm |
| $TC1_{23}$ | 1.092547 mm | TTL1 | 13.955356 mm | $TC1_{34}$ | 0.074078 mm |
| SL1 | 10.887305 mm | $D1_4$ | 3.3199 mm | fl | 14.045 mm |
| $TC1_{12}$ | 1.757138 mm | | | | |
| $R1_{41}/R1_{11}$ | −2.186 | $(fl_1 + fl_3)/fl_2$ | −3.300 | TTL1/5 | 2.791 mm |
| SL1/TTL1 | 0.780 | $D1_4$/TTL1 | 0.238 | fl/TTL1 | 1.006 |
| $(TC1_{12} + TC1_{23})$/TTL1 | 0.204 | | | | |

Figure 2B:
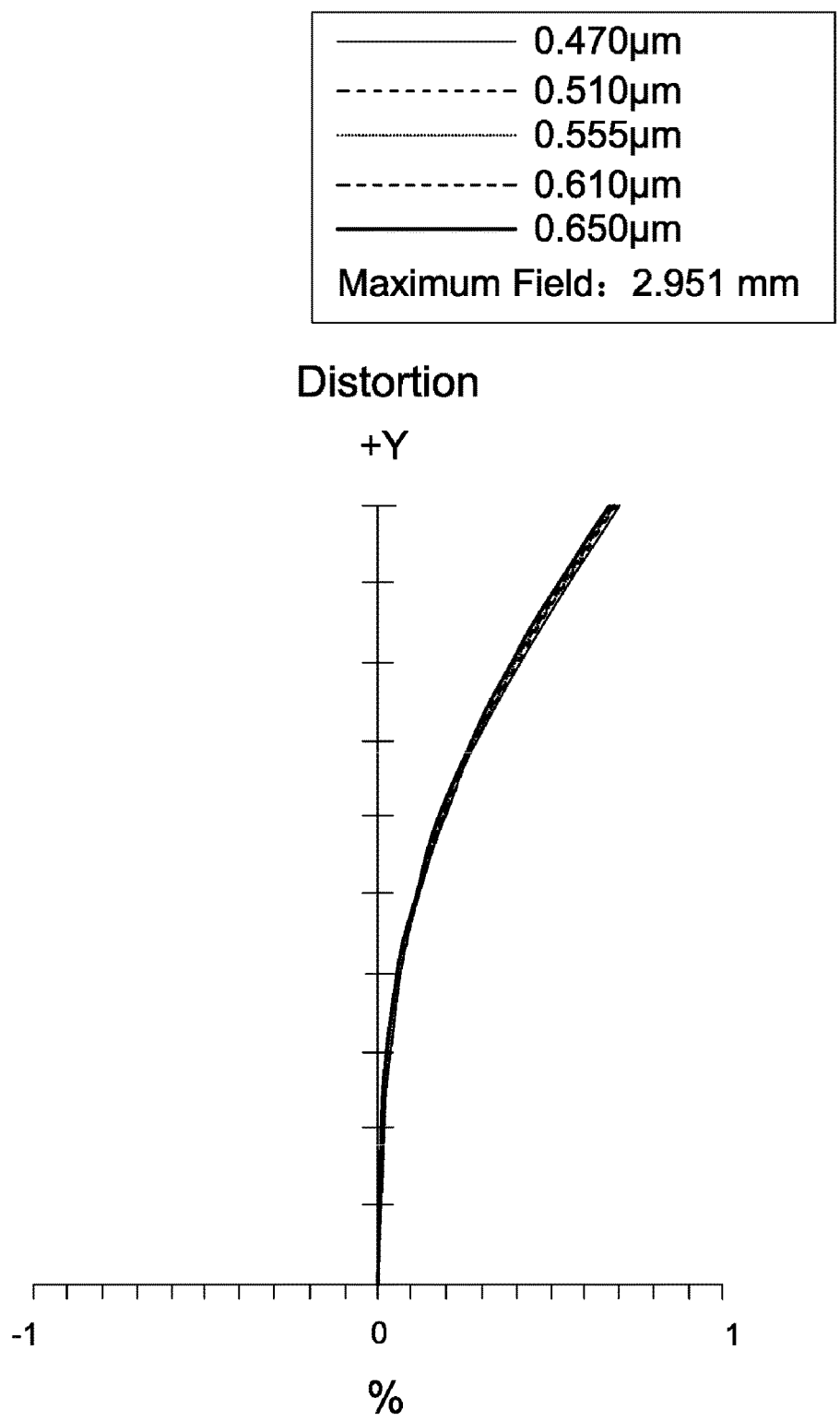
FIG. 2B is a distortion diagram of the lens assembly in accordance with the first embodiment of the invention.

By the above arrangements of the lenses and stop ST1, the lens assembly 1 of the first embodiment can meet the requirements of optical performance as seen in FIGS. 2A-2C, wherein FIG. 2A shows a field curvature diagram of the lens assembly 1 in accordance with the first embodiment of the invention, FIG. 2B shows a distortion diagram of the lens assembly 1 in accordance with the first embodiment of the invention, and FIG. 2C shows a modulation transfer function diagram of the lens assembly 1 in accordance with the first embodiment of the invention.

It can be seen from FIG. 2A that the field curvature of tangential direction and sagittal direction in the lens assembly 1 of the first embodiment ranges from −0.06 mm to 0.12 mm for the wavelength of 0.470 μm, 0.510 μm, 0.555 μm, 0.610 μm, and 0.650 μm.

It can be seen from FIG. 2B (in which the five lines in the figure almost coincide to appear as if a signal line) that the distortion in the lens assembly 1 of the first embodiment ranges from 0% to 0.7% for the wavelength of 0.470 μm, 0.510 μm, 0.555 μm, 0.610 μm, and 0.650 μm.

It can be seen from FIG. 2C that the modulation transfer function of tangential direction and sagittal direction in the lens assembly 1 of the first embodiment ranges from 0.15 to 1.0 wherein the wavelength ranges from 0.4700 μm to 0.6500 μm, the fields respectively are 0.0000 mm, 1.0604 mm, 2.1208 mm, 2.6510 mm, and 2.9510 mm, and the spatial frequency ranges from 0 lp/mm to 250 lp/mm.

It is obvious that the field curvature and the distortion of the lens assembly 1 of the first embodiment can be corrected effectively, and the resolution of the lens assembly 1 of the first embodiment can meet the requirement. Therefore, the lens assembly 1 of the first embodiment is capable of good optical performance.

Referring to Table 4 and Table 5, Table 4 provides optical specifications in accordance with a second embodiment of the invention; Table 5 provides aspheric coefficients of each surface in Table 4.

The figure which depicts the lens layout diagram of the lens assembly in accordance with the second embodiment of the invention is similar to the figure which depicts the lens layout diagram of the lens assembly in accordance with the first embodiment of the invention, thus the figure which depicts the lens layout diagram of the lens assembly in accordance with the second embodiment of the invention is omitted.

Table 4 shows that the effective focal length is equal to 14.05 mm, F-number is equal to 2.6, total lens length is equal to 13.74895 mm, and field of view is equal to 21.4 degrees for the lens assembly of the second embodiment of the invention.

TABLE 4

| Surface Number | Radius of Curvature (mm) | Thickness (mm) | Nd | Vd | Remark |
|---|---|---|---|---|---|
| S21 | 4.152695 | 1.88 | 1.6779 | 55.34 | The First Lens L21 |
| S22 | 42.77628 | 1.278907 | | | |
| S23 | ∞ | 0.103423 | | | Stop ST2 |
| S24 | −10.8027 | 0.499091 | 1.651 | 21.5 | The Second Lens L22 |
| S25 | 3.993041 | 0.869473 | | | |
| S26 | 402.8873 | 1.182798 | 1.651 | 21.5 | The Third Lens L23 |
| S27 | −5.5925 | 0.20964 | | | |
| S28 | −9.41741 | 0.494747 | 1.535037 | 55.71072 | The Fourth Lens L24 |
| S29 | −15.3079 | 2 | | | |

TABLE 4-continued

| Surface Number | Radius of Curvature (mm) | Thickness (mm) | Nd | Vd | Remark |
|---|---|---|---|---|---|
| S210 | ∞ | 0.21 | 1.5168 | 64.16734 | Optical Filter OF2 |
| S211 | ∞ | 5.020871 | | | |

Effective Focal Length = 14.05 mm
F-number = 2.6
Total Lens Length = 13.74895 mm
Field of View = 21.4 Degrees The aspheric surface sag z of each lens in table 4 can be calculated by the following formula:

$$z=ch^2/\{1+[1-(k+1)c^2h^2]^{1/2}\}+Ah^4+Bh^6+Ch^8+Dh^{10}+Eh^{12}+Fh^{14}+Gh^{16}$$

where c is curvature, h is the vertical distance from the lens surface to the optical axis, k is conic constant and A, B, C, D, E, F and G are aspheric coefficients.

In the second embodiment, the conic constant k and the aspheric coefficients A, B, C, D, E, F, G of each surface are shown in Table 5.

TABLE 5

| Surface Number | k | A | B | C |
|---|---|---|---|---|
| S21 | −0.0779 | 0.000101752 | 3.96285E−05 | −3.83953E−06 |
| S22 | 0 | 0.000957106 | −2.21093E−05 | 2.76129E−06 |
| S24 | 0 | 0.004190337 | 0.000688664 | −0.000119974 |
| S25 | 0.511649 | 0.00010063 | 0.001891077 | 0.000755339 |
| S26 | 1752.94 | −0.005874138 | 0.000317259 | 0.000354157 |
| S27 | −5.18281 | 0.000393467 | −0.001638383 | 9.43479E−05 |
| S28 | −113.589 | −0.016504268 | 0.001437002 | −0.000476861 |
| S29 | 30.06203 | −0.009515477 | 0.000136398 | −0.00054654 |

| Surface Number | D | E | F | G |
|---|---|---|---|---|
| S21 | 3.15859E−07 | 1.8968E−09 | 1.04076E−08 | −7.237E−10 |
| S22 | 1.83386E−07 | 5.42685E−07 | −1.03194E−07 | 4.82036E−09 |
| S24 | −3.98282E−06 | −1.81517E−06 | −5.13423E−07 | 1.67334E−07 |
| S25 | −0.000393058 | 6.00761E−06 | 4.17752E−05 | −8.47135E−06 |
| S26 | −1.83866E−05 | −1.44298E−05 | 5.44078E−08 | 1.83706E−06 |
| S27 | 6.7952E−05 | −2.87308E−05 | −9.46918E−06 | 4.22885E−06 |
| S28 | −0.000358779 | 2.43477E−05 | 2.02707E−05 | −2.05764E−06 |
| S29 | 2.09595E−05 | 6.16438E−06 | 2.65426E−06 | −6.56563E−07 |

In order to maintain excellent optical performance of the lens assembly in accordance with the second embodiment of the invention, the lens assembly satisfies at least one of the following conditions:

$$R2_{41}/R2_{11}<0 \quad (10)$$

$$(f2_1+f2_3)/f2_2<0 \quad (11)$$

$$f2_{234}<0 \quad (12)$$

$$TC2_{23}<TTL2/5 \quad (13)$$

$$TC2_{34}<TTL2/5 \quad (14)$$

$$0.6<SL2/TTL2<1.1 \quad (15)$$

$$0.2<D2_4/TTL2<0.6 \quad (16)$$

$$1<f2/TTL2<1.5 \quad (17)$$

$$0.07<(TC2_{12}+TC2_{23})/TTL2<0.25 \quad (18)$$

The definition of $f2_1$, $f2_2$, $f2_3$, $f2_{234}$, $R2_{11}$, $R2_{41}$, $TC2_{23}$, $TC2_{34}$, SL2, TTL2, $D2_4$, f2, and $TC2_{12}$ are the same as that of $f1_1$, $f1_2$, $f1_3$, $f1_{234}$, $R1_{11}$, $R1_{41}$, $TC1_{23}$, $TC1_{34}$, SL1, TTL1, $D1_4$, f1, and $TC1_{12}$ in the first embodiment, and is not described here again.

By the above design of the lenses, stop ST2, and satisfies at least one of the conditions (10)-(18), the lens assembly is provided with an effective shortened total lens length, an effective corrected aberration, and an increased resolution.

Table 6 shows the parameters and condition values for conditions (10)-(18). As can be seen from Table 6, the lens assembly of the second embodiment satisfies the conditions (10)-(18).

TABLE 6

| | | | | | |
|---|---|---|---|---|---|
| $R2_{11}$ | 4.152695 mm | $R2_{41}$ | −9.41741 mm | $f2_1$ | 1.0547 mm |
| $f2_2$ | −1.2195 mm | $f2_3$ | 2.2526 mm | $f2_{234}$ | −10.649 mm |
| $TC2_{23}$ | 0.869473 mm | TTL2 | 13.74895 mm | $TC2_{34}$ | 0.20964 mm |
| SL2 | 10.590043 mm | $D2_4$ | 4.2462 mm | f2 | 14.05 mm |
| $TC2_{12}$ | 1.38233 mm | | | | |

TABLE 6-continued

| $R2_{41}/R2_{11}$ | −2.268 | $(f2_1 + f2_3)/f2_2$ | −2.712 | TTL2/5 | 2.750 mm |
|---|---|---|---|---|---|
| SL2/TTL2 | 0.770 | $D2_4$/TTL2 | 0.309 | f2/TTL2 | 1.022 |
| $(TC2_{12} + TC2_{23})$/TTL2 | 0.164 | | | | |

The field curvature (figure is omitted) and the distortion (figure is omitted) of the lens assembly of the second embodiment can be corrected effectively, and the resolution of the lens assembly of the second embodiment can meet the requirement. Therefore, the lens assembly of the second embodiment is capable of good optical performance.

Referring to FIG. 3, FIG. 3 is a lens layout diagram of a lens assembly in accordance with a third embodiment of the invention. The lens assembly 5 includes a stop ST5, a first lens L51, a second lens L52, a third lens L53, a fourth lens L54, and an optical filter OF5, all of which are arranged in order from an object side to an image side along an optical axis OAS. In operation, an image of light rays from the object side is formed at an image plane IMA5.

The first lens L51 is a meniscus lens with positive refractive power and made of glass material, wherein the object side surface S52 is a convex surface, the image side surface S53 is a concave surface, and both of the object side surface S52 and image side surface S53 are aspheric surfaces.

The second lens L52 is a biconcave lens with negative refractive power and made of glass material, wherein the object side surface S54 is a concave surface, the image side surface S55 is a concave surface, and both of the object side surface S54 and image side surface S55 are aspheric surfaces.

The third lens L53 is a biconvex lens with positive refractive power and made of glass material, wherein the object side surface S56 is a convex surface, the image side surface S57 is a convex surface, and both of the object side surface S56 and image side surface S57 are aspheric surfaces.

The fourth lens L54 is a meniscus lens with negative refractive power and made of glass material, wherein the object side surface S58 is a concave surface, the image side surface S59 is a convex surface, and both of the object side surface S58 and image side surface S59 are aspheric surfaces.

Both of the object side surface S510 and image side surface S511 of the optical filter OF5 are plane surfaces.

In order to maintain excellent optical performance of the lens assembly in accordance with the third embodiment of the invention, the lens assembly 5 satisfies at least one of the following conditions:

$$R5_{41}/R5_{11} < 0 \tag{19}$$

$$(f5_1 + f5_3)/f5_2 < 0 \tag{20}$$

$$f5_{234} < 0 \tag{21}$$

$$TC5_{23} < TTL5/5 \tag{22}$$

$$TC5_{34} < TTL5/5 \tag{23}$$

$$0.6 < SL5/TTL5 < 1.1 \tag{24}$$

$$0.2 < D5_4/TTL5 < 0.6 \tag{25}$$

$$1 < f5/TTL5 < 1.5 \tag{26}$$

$$0.07 < (TC5_{12} + TC5_{23})/TTL5 < 0.25 \tag{27}$$

The definition of $f5_1$, $f5_2$, $f5_3$, $f5_{234}$, $R5_{11}$, $R5_{41}$, $TC5_{23}$, $TC5_{34}$, SL5, TTL5, $D5_4$, f5, and $TC5_{12}$ are the same as that of $f1_1$, $f1_2$, $f1_3$, $f1_{234}$, $R1_{11}$, $R1_{41}$, $TC1_{23}$, $TC1_{34}$, SL1, TTL1, $D1_4$, f1, and $TC1_{12}$ in the first embodiment, and is not described here again.

By the above design of the lenses, stop ST5, and satisfies at least one of the conditions (19)-(27), the lens assembly 5 is provided with an effective shortened total lens length, an effective corrected aberration, and an increased resolution.

In order to achieve the above purposes and effectively enhance the optical performance, the lens assembly 5 in accordance with the third embodiment of the invention is provided with the optical specifications shown in Table 7, which include the effective focal length, F-number, total lens length, field of view, radius of curvature of each lens surface, thickness between adjacent surface, refractive index of each lens and Abbe number of each lens. Table 7 shows that the effective focal length is equal to 14.05 mm, F-number is equal to 2.6, total lens length is equal to 13.920795 mm, and field of view is equal to 23.7 degrees for the lens assembly 5 of the third embodiment of the invention.

TABLE 7

| Surface Number | Radius of Curvature (mm) | Thickness (mm) | Nd | Vd | Remark |
|---|---|---|---|---|---|
| S51 | ∞ | −0.89895 | | | Stop ST5 |
| S52 | 4.24419 | 1.75 | 1.6779 | 55.34 | The First Lens L51 |
| S53 | 50.34631 | 1.502291 | | | |
| S54 | −10.4257 | 0.499235 | 1.651 | 21.5 | The Second Lens L52 |
| S55 | 3.707345 | 0.893974 | | | |
| S56 | 81.41846 | 0.920014 | 1.651 | 21.5 | The Third Lens L53 |
| S57 | −5.38878 | 0.126723 | | | |
| S58 | −9.67508 | 0.58058 | 1.535037 | 55.71072 | The Fourth Lens L54 |
| S59 | −13.6523 | 2 | | | |
| S510 | ∞ | 0.21 | 1.5168 | 64.16734 | Optical Filter OF5 |
| S511 | ∞ | 5.437978 | | | |

Effective Focal Length = 14.05 mm
F-number = 2.6
Total Lens Length = 13.920795 mm
Field of View = 23.7 Degrees The aspheric surface sag z of each lens in table 7 can be calculated by the following formula:

$$z = ch^2/\{1+[1-(k+1)c^2h^2]^{1/2}\}+Ah^4+Bh^6+Ch^8+Dh^{10}+Eh^{12}+Fh^{14}+Gh^{16}$$

where c is curvature, h is the vertical distance from the lens surface to the optical axis, k is conic constant and A, B, C, D, E, F and G are aspheric coefficients.

In the third embodiment, the conic constant k and the aspheric coefficients A, B, C, D, E, F, G of each surface are shown in Table 8.

TABLE 8

| Surface Number | k | A | B | C |
|---|---|---|---|---|
| S52 | −0.09669 | 5.36281E−05 | 3.65568E−05 | −4.181E−06 |
| S53 | 0 | 0.000882678 | −3.15891E−05 | 2.23358E−06 |
| S54 | 0 | 0.004868478 | 0.000688664 | −0.000129396 |
| S55 | 0.458801 | −0.000332236 | 0.001957951 | 0.000812508 |
| S56 | −49064.1 | −0.005928349 | 5.02851E−05 | 0.000312393 |
| S57 | −4.45564 | −0.000349057 | −0.001770879 | 3.17841E−05 |
| S58 | −155.281 | −0.016156725 | 0.00159046 | −0.000453266 |
| S59 | 24.71793 | −0.009216381 | 0.00025303 | −0.000508394 |

| Surface Number | D | E | F | G |
|---|---|---|---|---|
| S52 | 3.17196E−07 | 1.73227E−09 | 1.09224E−08 | −8.66124E−10 |
| S53 | 1.83974E−07 | 5.51625E−07 | −1.0296E−07 | 4.77723E−09 |
| S54 | −3.36628E−06 | −8.90345E−07 | −2.57339E−07 | 8.3741E−08 |
| S55 | −0.000389346 | 1.15141E−06 | 4.10596E−05 | −8.0349E−06 |
| S56 | −2.09919E−05 | −1.44814E−05 | −4.85378E−07 | 1.94435E−06 |
| S57 | 6.02975E−05 | −2.9941E−05 | −9.43636E−06 | 4.34879E−06 |
| S58 | −0.000363776 | 2.54399E−05 | 2.07883E−05 | −2.04616E−06 |
| S59 | 2.5966E−05 | 5.76021E−06 | 2.50598E−06 | −6.25222E−07 |

Table 9 shows the parameters and condition values for conditions (19)-(27). As can be seen from Table 9, the lens assembly 5 of the third embodiment satisfies the conditions (19)-(27).

TABLE 9

| | | | | | |
|---|---|---|---|---|---|
| $R5_{11}$ | 4.24419 mm | $R5_{41}$ | −9.67508 mm | $f5_1$ | 1.266 mm |
| $f5_2$ | −1.122 mm | $f5_3$ | 2.345 mm | $f5_{234}$ | −11.411 mm |
| $TC5_{23}$ | 0.893974 mm | TTL5 | 13.920795 mm | $TC5_{34}$ | 0.126723 mm |
| SL5 | 13.021845 mm | $D5_4$ | 3.2823 mm | f5 | 14.05 mm |
| $TC5_{12}$ | 1.502291 mm | | | | |
| $R5_{41}/R5_{11}$ | −2.280 | $(f5_1 + f5_3)/f5_2$ | −3.218 | TTL5/5 | 2.784 mm |
| SL5/TTL5 | 0.935 | $D5_4$/TTL5 | 0.236 | f5/TTL5 | 1.009 |
| $(TC5_{12} + TC5_{23})$/TTL5 | 0.172 | | | | |

Figure 4A:
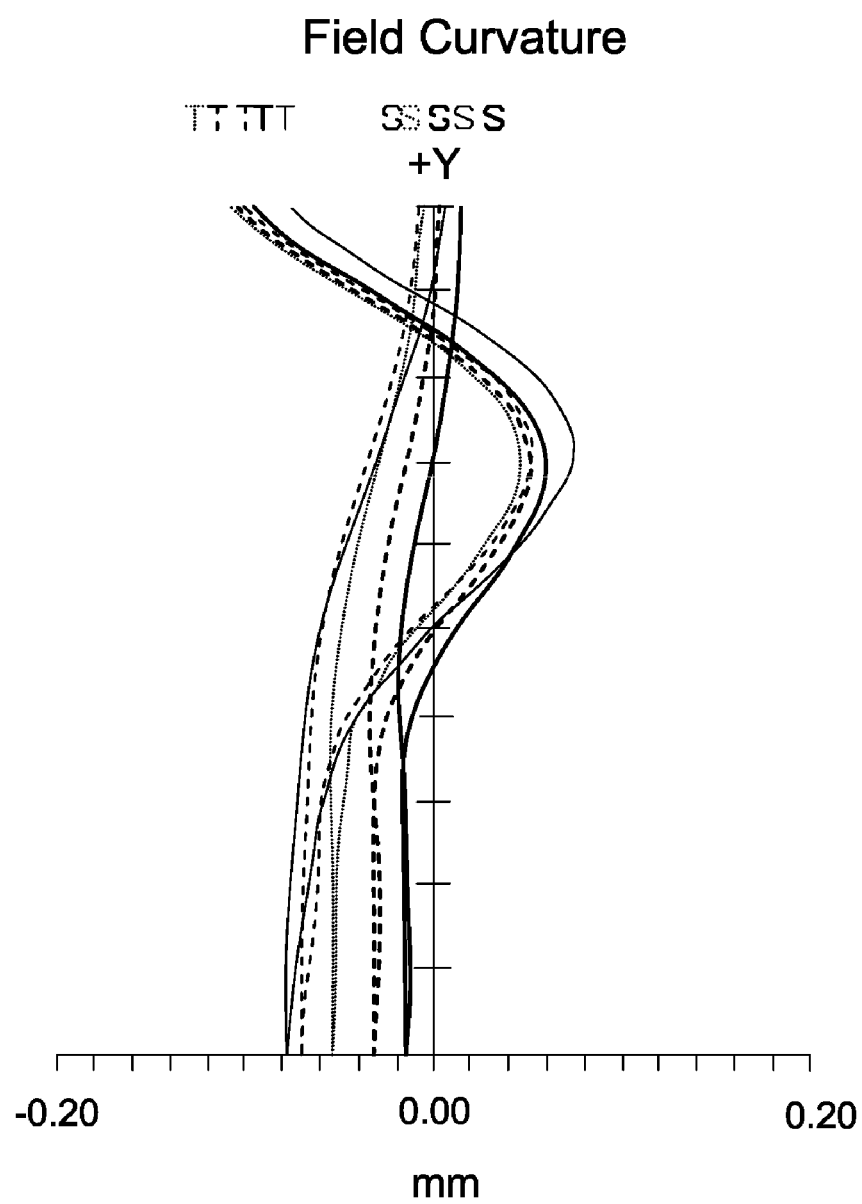
FIG. 4A depicts a field curvature diagram of the lens assembly in accordance with the third embodiment of the invention.
Figure 4B:
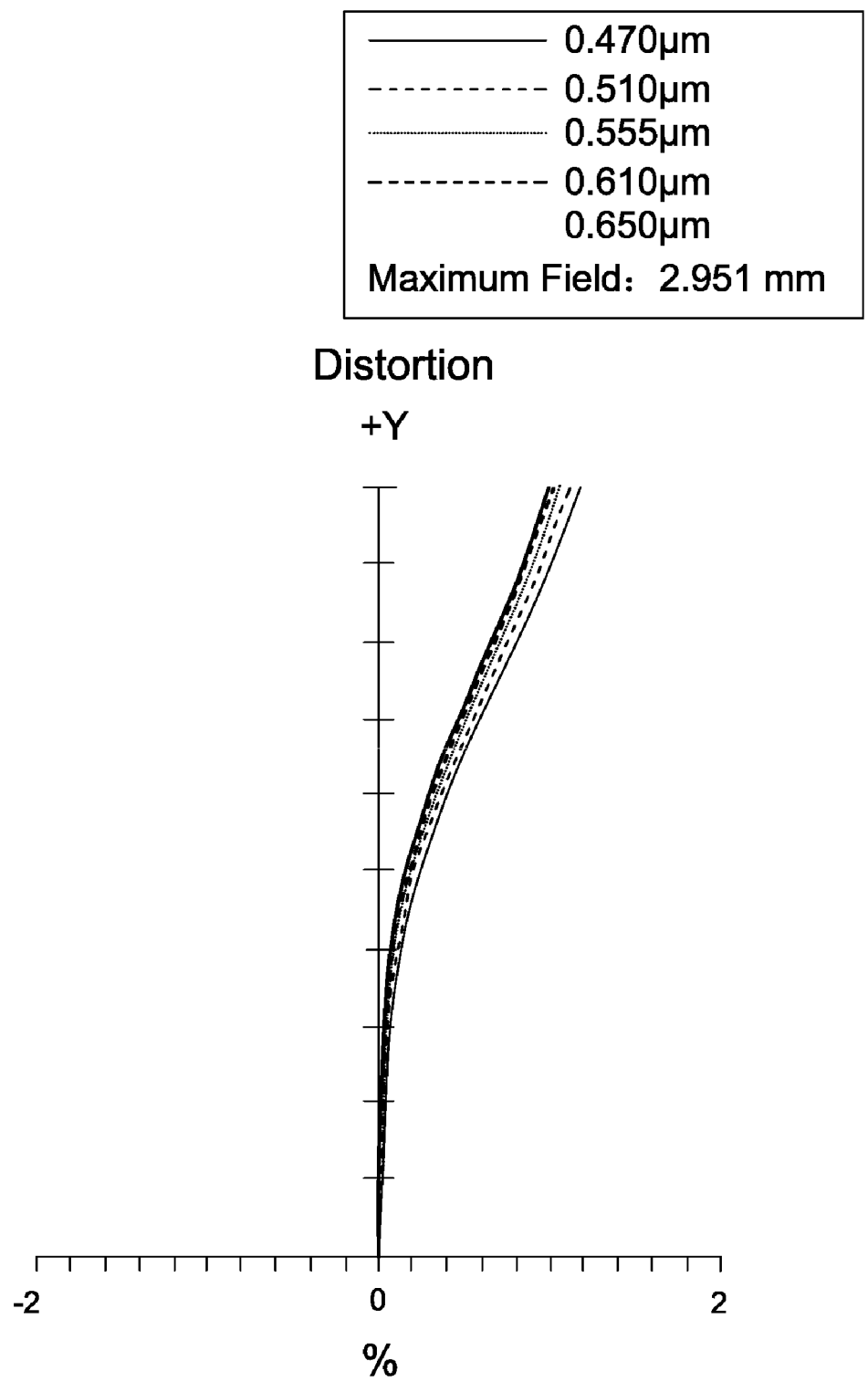
FIG. 4B is a distortion diagram of the lens assembly in accordance with the third embodiment of the invention.
Figure 4C:
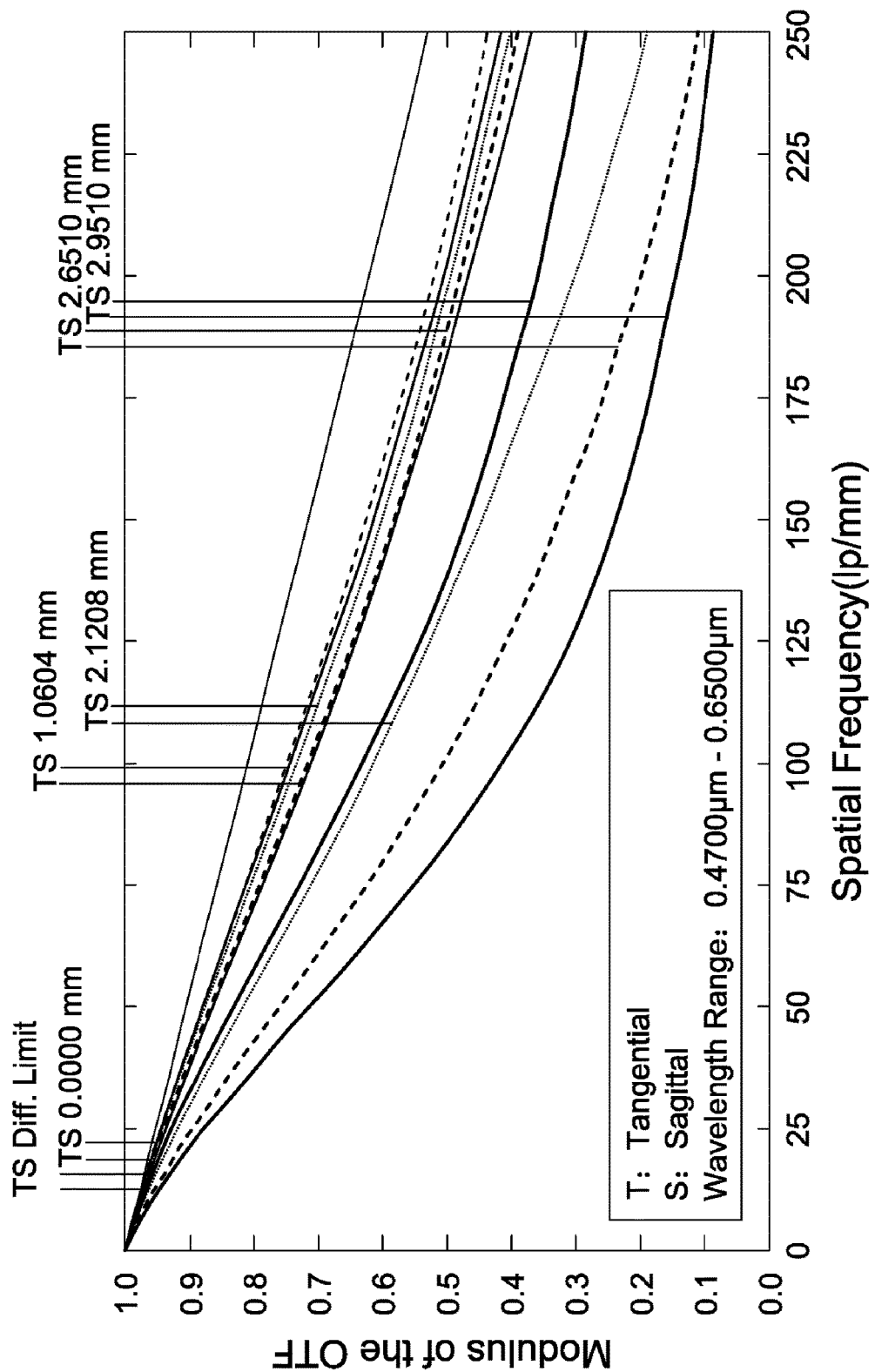
FIG. 4C is a modulation transfer function diagram of the lens assembly in accordance with the third embodiment of the invention.

By the above arrangements of the lenses and stop ST5, the lens assembly 5 of the third embodiment can meet the requirements of optical performance as seen in FIGS. 4A-4C, wherein FIG. 4A shows a field curvature diagram of the lens assembly 5 in accordance with the third embodiment of the invention, FIG. 4B shows a distortion diagram of the lens assembly 5 in accordance with the third embodiment of the invention, and FIG. 4C shows a modulation transfer function diagram of the lens assembly 5 in accordance with the third embodiment of the invention.

It can be seen from FIG. 4A that the field curvature of tangential direction and sagittal direction in the lens assembly 5 of the third embodiment ranges from −0.15 mm to 0.08 mm for the wavelength of 0.470 µm, 0.510 µm, 0.555 µm, 0.610 µm, and 0.650 µm.

It can be seen from FIG. 4B that the distortion in the lens assembly 5 of the third embodiment ranges from 0.0% to 1.2% for the wavelength of 0.470 µm, 0.510 µm, 0.555 µm, 0.610 µm, and 0.650 µm.

It can be seen from FIG. 4C that the modulation transfer function of tangential direction and sagittal direction in the lens assembly 5 of the third embodiment ranges from 0.08 to 1.0 wherein the wavelength ranges from 0.4700 µm to 0.6500 µm, the fields respectively are 0.0000 mm, 1.0604 mm, 2.1208 mm, 2.6510 mm, and 2.9510 mm, and the spatial frequency ranges from 0 lp/mm to 250 lp/mm.

It is obvious that the field curvature and the distortion of the lens assembly 5 of the third embodiment can be corrected effectively, and the resolution of the lens assembly 5 of the third embodiment can meet the requirement. Therefore, the lens assembly 5 of the third embodiment is capable of good optical performance.

Figure 5:
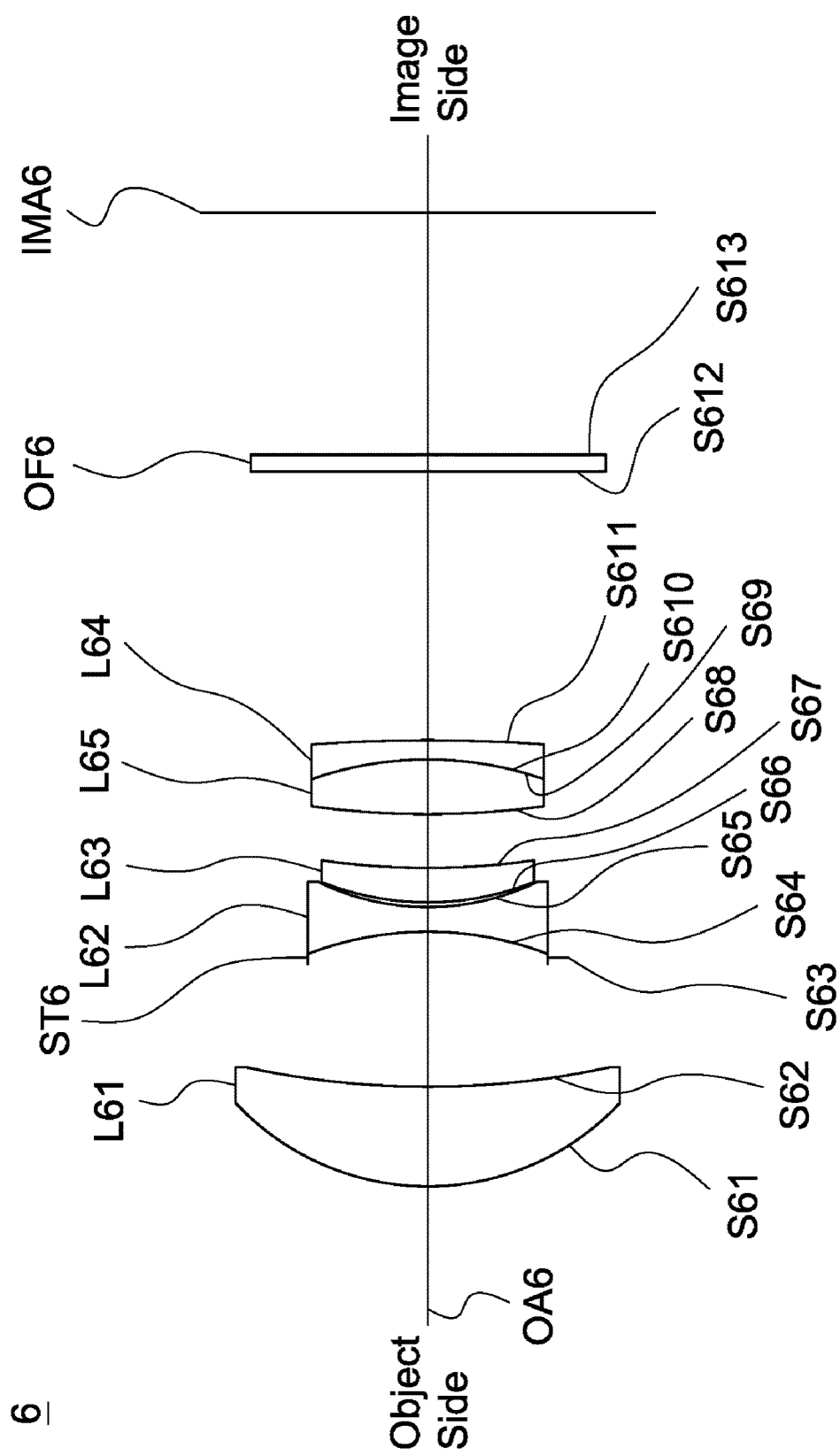
FIG. 5 is a lens layout diagram of a lens assembly in accordance with a fourth embodiment of the invention.

Referring to FIG. 5, FIG. 5 is a lens layout diagram of a lens assembly in accordance with a fourth embodiment of the invention. The lens assembly 6 includes a first lens L61, a stop ST6, a second lens L62, a third lens L63, a fifth lens L65, a fourth lens L64, and an optical filter OF6, all of which are arranged in order from an object side to an image side along an optical axis OA6. In operation, an image of light rays from the object side is formed at an image plane IMA6.

The first lens L61 is a meniscus lens with positive refractive power and made of glass material, wherein the object side surface S61 is a convex surface, the image side surface S62 is a concave surface, and both of the object side surface S61 and image side surface S62 are aspheric surfaces.

The second lens L62 is a biconcave lens with negative refractive power and made of glass material, wherein the object side surface S64 is a concave surface, the image side surface S65 is a concave surface, and both of the object side surface S64 and image side surface S65 are aspheric surfaces.

The third lens L63 is a meniscus lens with positive refractive power and made of glass material, wherein the object side surface S66 is a convex surface, the image side surface S67 is a concave surface, and both of the object side surface S66 and image side surface S67 are aspheric surfaces.

The fifth lens L65 is a biconvex lens with positive refractive power and made of glass material, wherein the object side surface S68 is a convex surface, the image side surface S69 is a convex surface, and both of the object side surface S68 and image side surface S69 are aspheric surfaces.

The fourth lens L64 is a biconcave lens with negative refractive power and made of glass material, wherein the object side surface S610 is a concave surface, the image side surface S611 is a concave surface, and both of the object side surface S610 and image side surface S611 are aspheric surfaces.

Both of the object side surface S612 and image side surface S613 of the optical filter OF6 are plane surfaces.

In order to maintain excellent optical performance of the lens assembly in accordance with the fourth embodiment of the invention, the lens assembly 6 satisfies at least one of the following conditions:

$$R6_{41}/R6_{11} < 0 \tag{28}$$

$$(f6_1 + f6_3)/f6_2 < 0 \tag{29}$$

$$f6_{2354} < 0 \tag{30}$$

$$TC6_{23} < TTL6/5 \tag{31}$$

$$0.6 < SL6/TTL6 < 1.1 \tag{32}$$

$$0.2 < D6_4/TTL6 < 0.6 \tag{33}$$

$$1 < f6/TTL6 < 1.5 \tag{34}$$

$$0.07 < (TC6_{12} + TC6_{23})/TTL6 < 0.25 \tag{35}$$

The definition of $f6_1$, $f6_2$, $f6_3$, $R6_{11}$, $R6_{41}$, SL6, TTL6, $D6_4$, f6, $TC6_{12}$, and $TC6_{23}$ are the same as that of $f1_1$, $f1_2$, $f1_3$, $R1_{11}$, $R1_{41}$, SL1, TTL1, $D1_4$, f1, $TC1_{12}$, and $TC1_{23}$ in the first embodiment, and is not described here again. $f6_{2354}$ is an effective focal length of a combination of the second lens L62, the third lens L63, the fifth lens L65, and the fourth lens L64.

By the above design of the lenses, stop ST6, and satisfies at least one of the conditions (28)-(35), the lens assembly 6 is provided with an effective shortened total lens length, an effective corrected aberration, and an increased resolution.

In order to achieve the above purposes and effectively enhance the optical performance, the lens assembly 6 in accordance with the fourth embodiment of the invention is provided with the optical specifications shown in Table 10, which include the effective focal length, F-number, total lens length, field of view, radius of curvature of each lens surface, thickness between adjacent surface, refractive index of each lens and Abbe number of each lens. Table 10 shows that the effective focal length is equal to 14.9947 mm, F-number is equal to 2.7, total lens length is equal to 14.005748 mm, and field of view is equal to 24 degrees for the lens assembly 6 of the fourth embodiment of the invention.

TABLE 10

| Surface Number | Radius of Curvature (mm) | Thickness (mm) | Nd | Vd | Remark |
|---|---|---|---|---|---|
| S61 | 3.784334 | 1.433 | 1.68548 | 54.62 | The First Lens L61 |
| S62 | 11.09087 | 1.87754 | | | |
| S63 | ∞ | 0.338391 | | | Stop ST6 |
| S64 | −3.50899 | 0.381 | 1.651 | 21.5 | The Second Lens L62 |
| S65 | 4.564805 | 0.027396 | | | |
| S66 | 3.515976 | 0.512 | 1.535037 | 55.71072 | The Third Lens L63 |
| S67 | 15.88092 | 0.802654 | | | |
| S68 | 8.284338 | 0.76 | 1.651 | 21.5 | The Fifth Lens L65 |
| S69 | −5.9282 | 0.015424 | | | |
| S610 | −7.28551 | 0.244 | 1.535037 | 55.71072 | The Fourth Lens L64 |
| S611 | 50.5587 | 3.904343 | | | |
| S612 | ∞ | 0.21 | 1.5168 | 64.16734 | Optical Filter OF6 |
| S613 | ∞ | 3.5 | | | |

Effective Focal Length = 14.9947 mm
F-number = 2.7
Total Lens Length = 14.005748 mm
Field of View = 24 Degrees The aspheric surface sag z of each lens in table 10 can be calculated by the following formula:

$$z = ch^2/\{1 + [1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the fourth embodiment, the conic constant k and the aspheric coefficients A, B, C, D, E, F, G of each surface are shown in Table 11.

TABLE 11

| Surface Number | k | A | B | C |
|---|---|---|---|---|
| S61 | 0.096435 | −0.000455251 | 6.65866E−05 | 1.8275E−05 |
| S62 | 0 | −0.00058112 | 3.13288E−05 | 1.58113E−05 |
| S64 | 0 | 0.020430211 | −0.001563449 | −0.000390386 |
| S65 | 5.508209 | 0.012309509 | −0.006616706 | −0.000303134 |
| S66 | 1.410546 | 0.003268566 | −0.005233348 | 0.000136692 |
| S67 | 63.79342 | 0.00176682 | 0.002596601 | 0.000523897 |
| S68 | 4.887451 | −0.013861826 | 0.00147422 | 0.00044261 |
| S69 | −14.0471 | −0.022264288 | 0.002909766 | 0.00130594 |
| S610 | −1.10634 | −0.0304701 | 0.007853715 | 0.00076484 |
| S611 | −8665.49 | −0.016555082 | 0.004541824 | −0.00167109 |

| Surface Number | D | E | F | G |
|---|---|---|---|---|
| S61 | 1.67293E−06 | 5.48093E−08 | 3.18719E−09 | 1.68678E−09 |
| S62 | 5.91359E−06 | 4.89115E−07 | 4.91543E−08 | 2.84277E−09 |
| S64 | 0.000110598 | 1.59602E−05 | 4.22397E−06 | 8.72226E−08 |
| S65 | 5.36595E−06 | 0.000159802 | 4.29522E−05 | 2.89889E−05 |
| S66 | −0.000229391 | 0.000247724 | 9.36682E−05 | 5.2708E−05 |
| S67 | −0.000668693 | 0.00021675 | 5.04587E−05 | 3.38513E−05 |
| S68 | 0.000105256 | 9.62277E−05 | 7.45466E−06 | 2.6462E−06 |
| S69 | 0.000187206 | −0.000296595 | 2.27019E−05 | 6.23973E−06 |
| S610 | −0.000713952 | 0.000163914 | 3.88E−05 | 1.03376E−05 |
| S611 | 0.000293334 | 4.05E−05 | 5.82E−06 | 7.86771E−07 |

Table 12 shows the parameters and condition values for conditions (28)-(35). As can be seen from Table 12, the lens assembly 6 of the fourth embodiment satisfies the conditions (28)-(35).

TABLE 12

| | | | | | |
|---|---|---|---|---|---|
| $R6_{11}$ | 3.784334 mm | $R6_{41}$ | −7.285551 mm | $f6_1$ | 1.391 mm |
| $f6_2$ | −0.85168 mm | $f6_3$ | 2.6729 mm | $f6_{2354}$ | −12.8505 mm |
| TTL6 | 14.005748 mm | SL6 | 10.695208 mm | $D6_4$ | 3.336 mm |
| f6 | 14.9947 mm | $TC6_{12}$ | 2.215931 mm | $TC6_{23}$ | 0.027396 mm |
| $R6_{41}/R6_{11}$ | −1.925 | $(f6_1 + f6_3)/f6_2$ | −4.772 | SL6/TTL6 | 0.764 |
| $D6_4$/TTL6 | 0.238 | f6/TTL6 | 1.071 | $(TC6_{12} + TC6_{23})$/TTL6 | 0.160 |
| TTL6/5 | 2.801 mm | | | | |

Figure 6A:
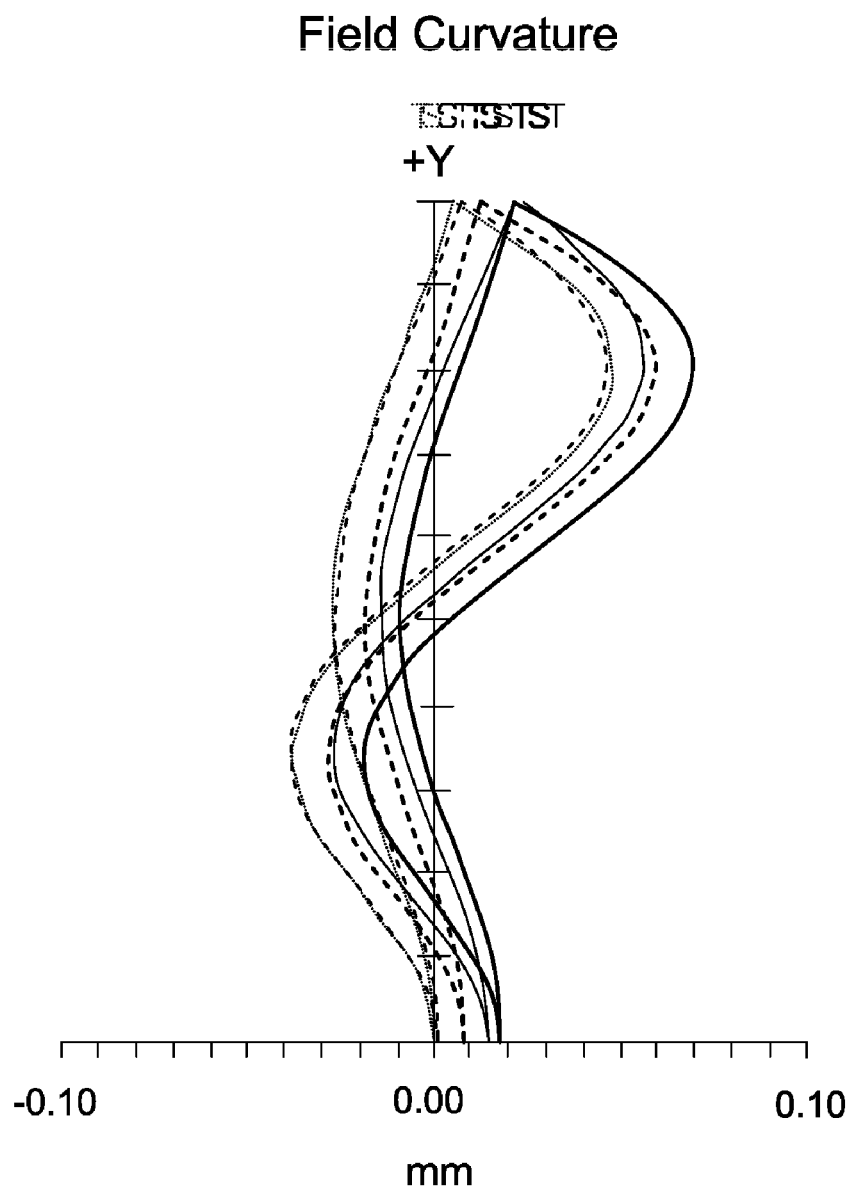
FIG. 6A depicts a field curvature diagram of the lens assembly in accordance with the fourth embodiment of the invention.
Figure 6B:
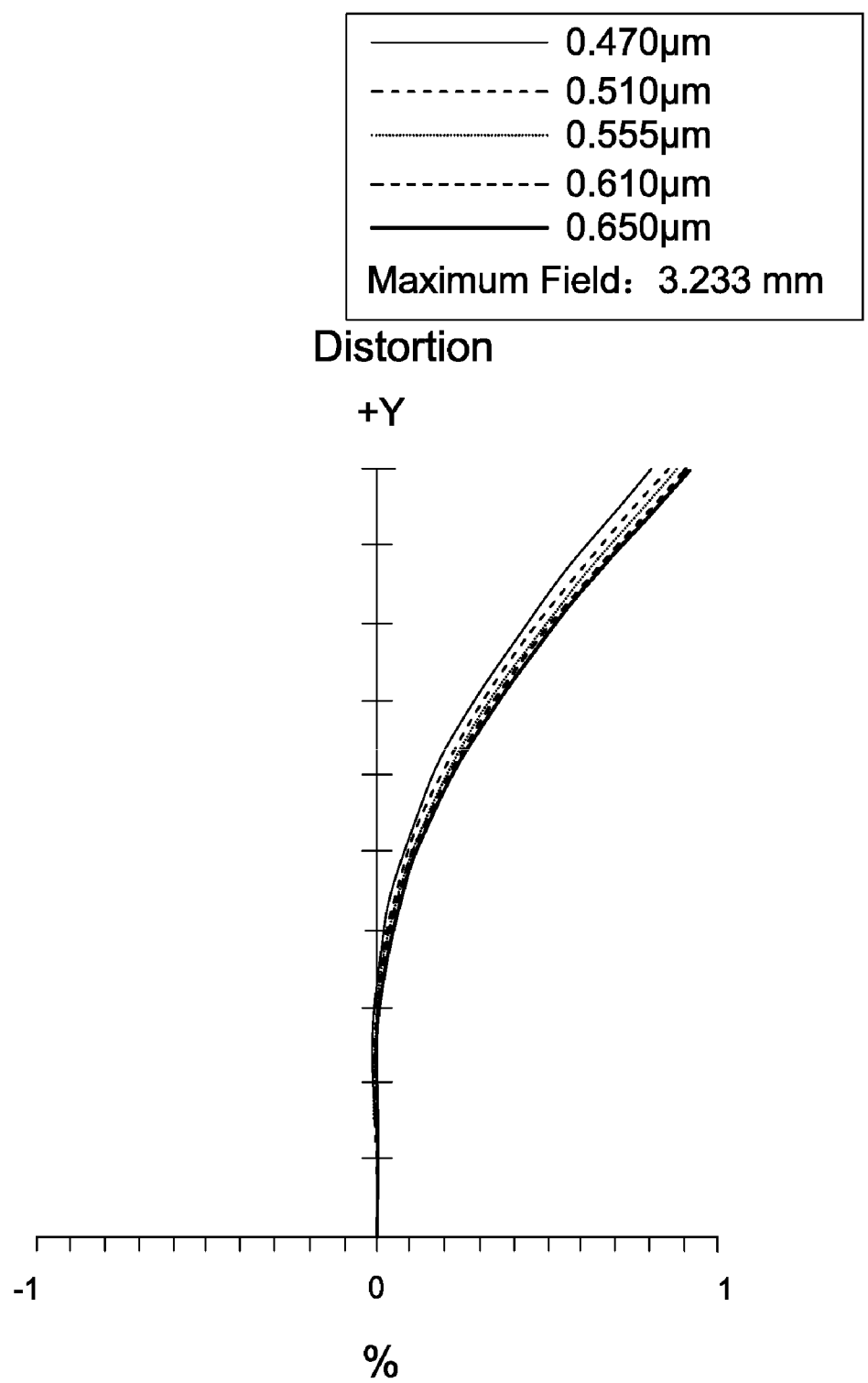
FIG. 6B is a distortion diagram of the lens assembly in accordance with the fourth embodiment of the invention.
Figure 6C:
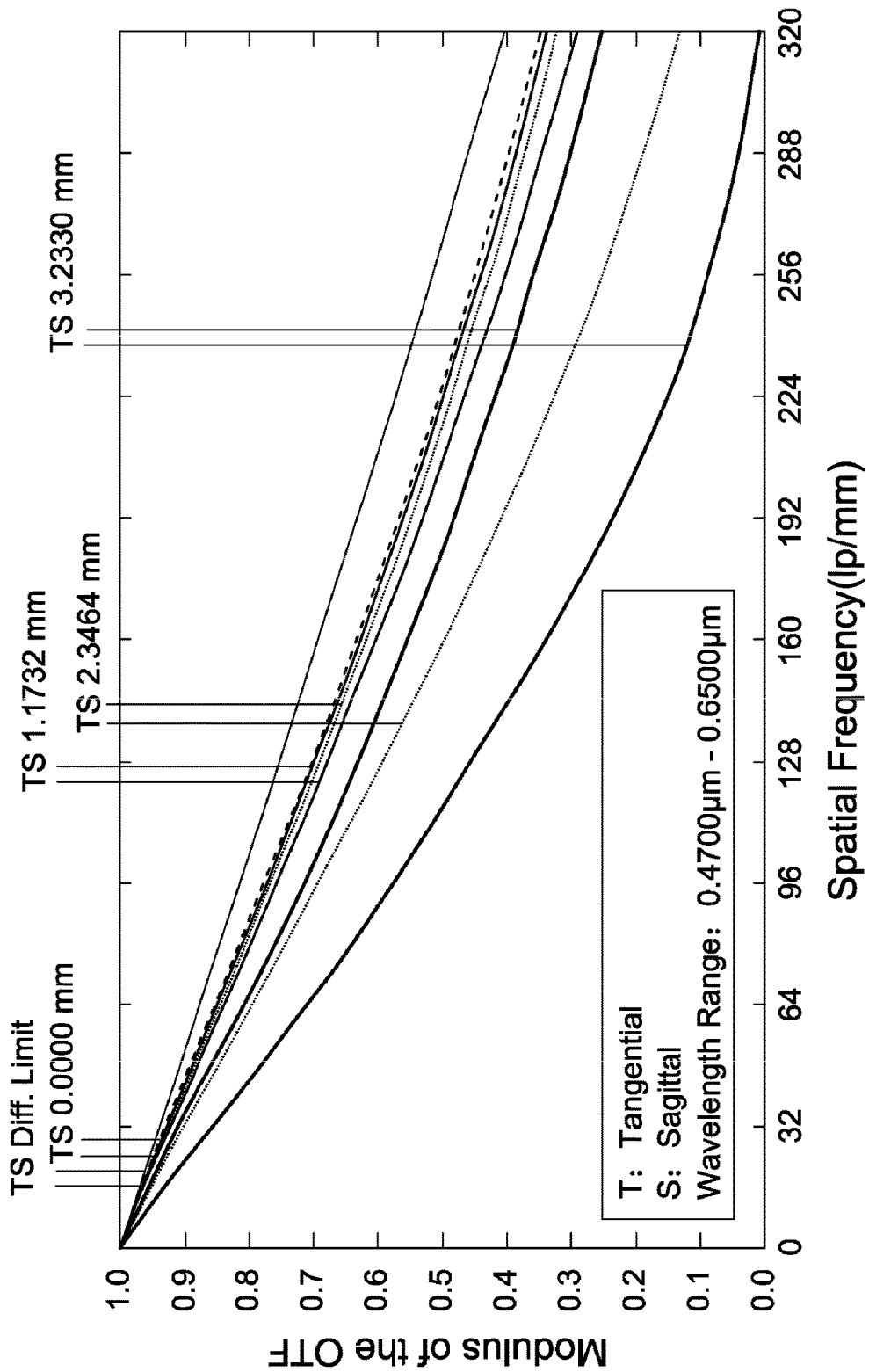
FIG. 6C is a modulation transfer function diagram of the lens assembly in accordance with the fourth embodiment of the invention.

By the above arrangements of the lenses and stop ST6, the lens assembly 6 of the fourth embodiment can meet the requirements of optical performance as seen in FIGS. 6A-6C, wherein FIG. 6A shows a field curvature diagram of the lens assembly 6 in accordance with the fourth embodiment of the invention, FIG. 6B shows a distortion diagram of the lens assembly 6 in accordance with the fourth embodiment of the invention, and FIG. 6C shows a modulation transfer function diagram of the lens assembly 6 in accordance with the fourth embodiment of the invention.

It can be seen from FIG. 6A that the field curvature of tangential direction and sagittal direction in the lens assembly 6 of the fourth embodiment ranges from −0.04 mm to 0.07 mm for the wavelength of 0.470 µm, 0.510 µm, 0.555 µm, 0.610 µm, and 0.650 µm.

It can be seen from FIG. 6B that the distortion in the lens assembly 6 of the fourth embodiment ranges from 0.0% to 0.9% for the wavelength of 0.470 µm, 0.510 µm, 0.555 µm, 0.610 µm, and 0.650 µm.

It can be seen from FIG. 6C that the modulation transfer function of tangential direction and sagittal direction in the lens assembly 6 of the fourth embodiment ranges from 0.01 to 1.0 wherein the wavelength ranges from 0.4700 µm to 0.6500 µm, the fields respectively are 0.0000 mm, 1.1732 mm, 2.3464 mm, and 3.2330 mm, and the spatial frequency ranges from 0 lp/mm to 320 lp/mm.

It is obvious that the field curvature and the distortion of the lens assembly 6 of the fourth embodiment can be corrected effectively, and the resolution of the lens assembly 6 of the fourth embodiment can meet the requirement. Therefore, the lens assembly 6 of the fourth embodiment is capable of good optical performance.

Figure 7:
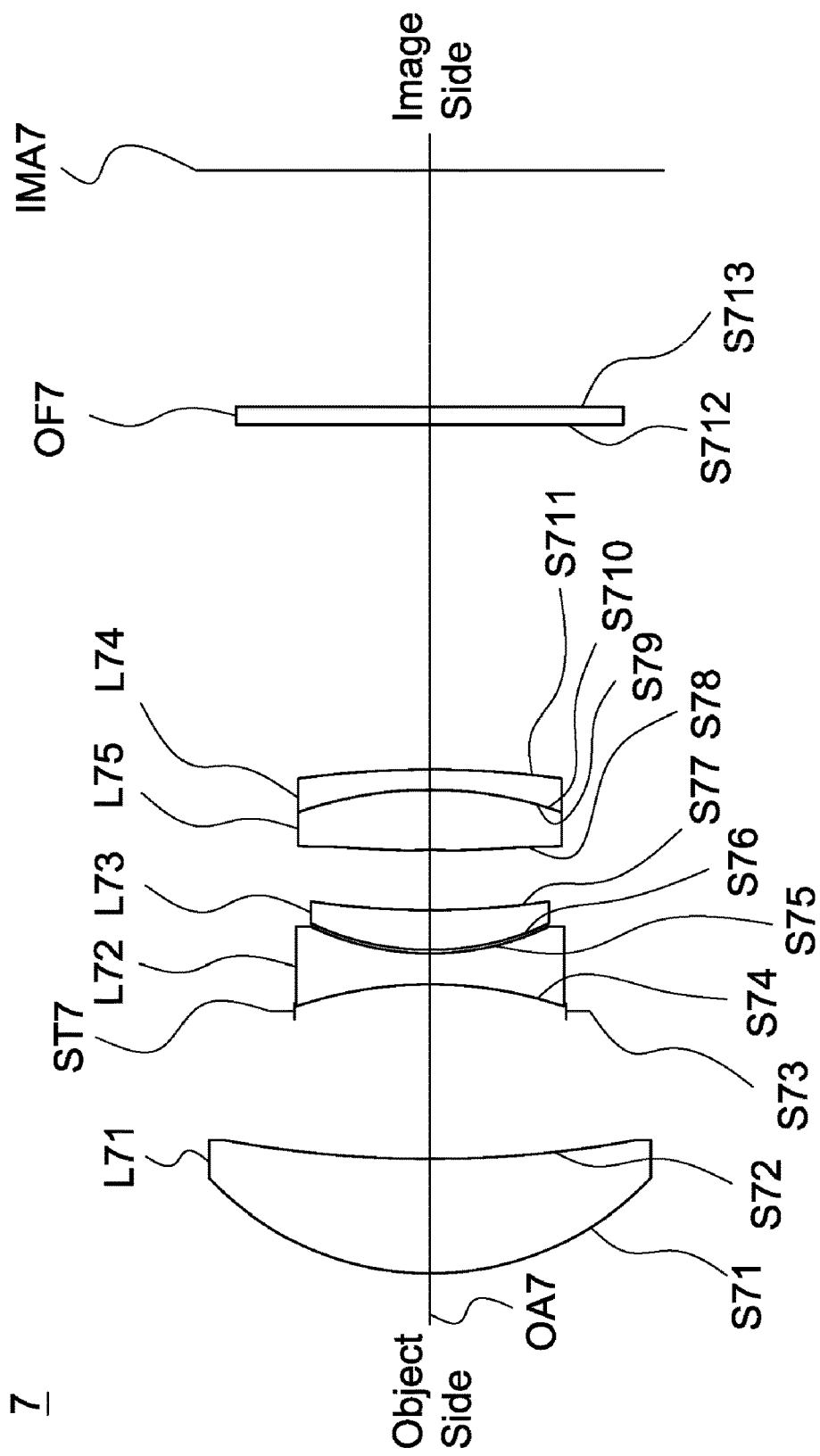
FIG. 7 is a lens layout diagram of a lens assembly in accordance with a fifth embodiment of the invention.

Referring to FIG. 7, FIG. 7 is a lens layout diagram of a lens assembly in accordance with a fifth embodiment of the invention. The lens assembly 7 includes a first lens L71, a stop ST7, a second lens L72, a third lens L73, a fifth lens L75, a fourth lens L74, and an optical filter OF7, all of which are arranged in order from an object side to an image side along an optical axis OA7. In operation, an image of light rays from the object side is formed at an image plane IMA7.

The first lens L71 is a meniscus lens with positive refractive power and made of glass material, wherein the object side surface S71 is a convex surface, the image side surface S72 is a concave surface, and both of the object side surface S71 and image side surface S72 are aspheric surfaces.

The second lens L72 is a biconcave lens with negative refractive power and made of glass material, wherein the object side surface S74 is a concave surface, the image side surface S75 is a concave surface, and both of the object side surface S74 and image side surface S75 are aspheric surfaces.

The third lens L73 is a meniscus lens with positive refractive power and made of glass material, wherein the object side surface S76 is a convex surface, the image side surface S77 is a concave surface, and both of the object side surface S76 and image side surface S77 are aspheric surfaces.

The fifth lens L75 is a biconvex lens with positive refractive power and made of glass material, wherein the object side surface S78 is a convex surface, the image side surface S79 is a convex surface, and both of the object side surface S78 and image side surface S79 are aspheric surfaces.

The fourth lens L74 is a meniscus lens with negative refractive power and made of glass material, wherein the object side surface S710 is a concave surface, the image side surface S711 is a convex surface, and both of the object side surface S710 and image side surface S711 are aspheric surfaces.

Both of the object side surface S712 and image side surface S713 of the optical filter OF7 are plane surfaces.

In order to maintain excellent optical performance of the lens assembly in accordance with the fifth embodiment of the invention, the lens assembly 7 satisfies at least one of the following conditions:

$$R7_{41}/R7_{11}<0 \tag{36}$$

$$(f7_1+f7_3)/f7_2<0 \tag{37}$$

$$f7_{2354}<0 \tag{38}$$

$$TC7_{23}<TTL7/5 \tag{39}$$

$$0.6<SL7/TTL7<1.1 \tag{40}$$

$$0.2<D7_4/TTL7<0.6 \tag{41}$$

$$1<f7/TTL7<1.5 \tag{42}$$

$$0.07<(TC7_{12}+TC7_{23})/TTL7<0.25 \tag{43}$$

The definition of $f7_1$, $f7_2$, $f7_3$, $f7_{2354}$, $R7_{11}$, $R7_{41}$, SL7, TTL7, $D7_4$, f7, $TC7_{12}$, and $TC7_{23}$ are the same as that of $f6_1$, $f6_2$, $f6_3$, $f6_{2354}$, $R6_{11}$, $R6_{41}$, SL6, TTL6, $D6_4$, f6, $TC6_{12}$, and $TC6_{23}$ in the fourth embodiment, and is not described here again.

By the above design of the lenses, stop ST7, and satisfies at least one of the conditions (36)-(43), the lens assembly 7 is provided with an effective shortened total lens length, an effective corrected aberration, and an increased resolution.

In order to achieve the above purposes and effectively enhance the optical performance, the lens assembly 7 in accordance with the fifth embodiment of the invention is provided with the optical specifications shown in Table 13, which include the effective focal length, F-number, total lens length, field of view, radius of curvature of each lens surface, thickness between adjacent surface, refractive index of each lens and Abbe number of each lens. Table 13 shows that the effective focal length is equal to 14.9971 mm, F-number is equal to 2.7, total lens length is equal to 14.00622223 mm, and field of view is equal to 22 degrees for the lens assembly 7 of the fifth embodiment of the invention.

TABLE 13

| Surface Number | Radius of Curvature (mm) | Thickness (mm) | Nd | Vd | Remark |
|---|---|---|---|---|---|
| S71 | 3.772868 | 1.433 | 1.68548 | 54.62 | The First Lens L71 |
| S72 | 11.14269 | 1.9008 | | | |
| S73 | ∞ | 0.342137 | | | Stop ST7 |
| S74 | −3.55368 | 0.381 | 1.651 | 21.5 | The Second Lens L72 |
| S75 | 4.493223 | 0.027396 | | | |
| S76 | 3.54722 | 0.512 | 1.535037 | 55.71072 | The Third Lens L73 |
| S77 | 14.92773 | 0.776122 | | | |
| S78 | 10.05021 | 0.76 | 1.651 | 21.5 | The Fifth Lens L75 |
| S79 | −5.78987 | 0.015424 | | | |
| S710 | −5.31384 | 0.244 | 1.535037 | 55.71072 | The Fourth Lens L74 |
| S711 | −17.7301 | 4.404343 | | | |
| S712 | ∞ | 0.21 | 1.5168 | 64.16734 | Optical Filter OF7 |
| S713 | ∞ | 3.000000 | | | |

Effective Focal Length = 14.9971 mm
F-number = 2.7
Total Lens Length = 14.00622223 mm
Field of View = 22 Degrees The aspheric surface sag z of each lens in table 13 can be calculated by the following formula:

$$z=ch^2/\{1+[1-(k+1)c^2h^2]^{1/2}\}+Ah^4+Bh^6+Ch^8+Dh^{10}+Eh^{12}+Fh^{14}+Gh^{16}$$

where c is curvature, h is the vertical distance from the lens surface to the optical axis, k is conic constant and A, B, C, D, E, F and G are aspheric coefficients.

In the fifth embodiment, the conic constant k and the aspheric coefficients A, B, C, D, E, F, G of each surface are shown in Table 14.

TABLE 14

| Surface Number | k | A | B | C |
|---|---|---|---|---|
| S71 | 0.090103 | −0.000468157 | 4.99923E−05 | 1.83484E−05 |
| S72 | 0 | −0.000703434 | 2.78E−05 | 1.58268E−05 |
| S74 | 0 | 0.02101117 | −0.001462312 | −0.000364879 |
| S75 | 5.568417 | 0.013387945 | −0.006143262 | −0.000245332 |
| S76 | 1.537315 | 0.004396321 | −0.005151907 | 0.000230629 |
| S77 | 62.78298 | 0.001826707 | 0.00287404 | 0.000506408 |
| S78 | 1.538457 | −0.014554376 | 0.000974136 | 0.000384192 |

TABLE 14-continued

| | | | | |
|---|---|---|---|---|
| S79 | −4.85221 | −0.023797012 | 0.002900541 | 0.001192856 |
| S710 | −4.7656 | −0.029260697 | 0.007738609 | 0.000876567 |
| S711 | −221.276 | −0.015192758 | 0.005037506 | −0.001743878 |

| Surface Number | D | E | F | G |
|---|---|---|---|---|
| S71 | 1.71559E−06 | 5.27631E−08 | 3.44328E−09 | 1.77037E−09 |
| S72 | 5.82249E−06 | 5.05209E−07 | 4.83387E−08 | 2.50833E−09 |
| S74 | 0.000113734 | 1.60361E−05 | 4.32439E−06 | 2.26063E−09 |
| S75 | 1.22151E−05 | 0.000169629 | 4.67817E−05 | 2.79496E−05 |
| S76 | −0.000209607 | 0.000246307 | 9.11268E−05 | 5.39436E−05 |
| S77 | −0.000683172 | 0.000207726 | 4.37326E−05 | 3.82914E−05 |
| S78 | 8.19556E−05 | −0.000108406 | 3.75804E−06 | −2.68063E−06 |
| S79 | 0.000153536 | −0.000301367 | 2.31497E−05 | 6.51694E−06 |
| S710 | −0.000680742 | 0.000166587 | 4.01E−05 | 1.00988E−05 |
| S711 | 0.000267191 | 4.09E−05 | 3.95E−06 | 8.09897E−07 |

Table 15 shows the parameters and condition values for conditions (36)-(43). As can be seen from Table 15, the lens assembly 7 of the fifth embodiment satisfies the conditions (36)-(43).

TABLE 15

| | | | | | |
|---|---|---|---|---|---|
| $R7_{11}$ | 3.772868 mm | $R7_{41}$ | −5.31384 mm | $f7_1$ | 1.3742 mm |
| $f7_2$ | −0.86125 mm | $f7_3$ | 2.8129 mm | $f7_{2354}$ | −12.9314 mm |
| TTL7 | 14.00622223 mm | SL7 | 10.67242223 mm | $D7_4$ | 3.3815 mm |
| f7 | 14.9971 mm | $TC7_{12}$ | 2.242937 mm | $TC7_{23}$ | 0.027396 mm |
| $R7_{41}/R7_{11}$ | −1.408 | $(f7_1 + f7_3)/f7_2$ | −4.862 | SL7/TTL7 | 0.762 |
| $D7_4$/TTL7 | 0.241 | f7/TTL7 | 1.071 | $(TC7_{12} + TC7_{23})$/TTL7 | 0.162 |
| TTL7/5 | 2.801 mm | | | | |

Figure 8A:
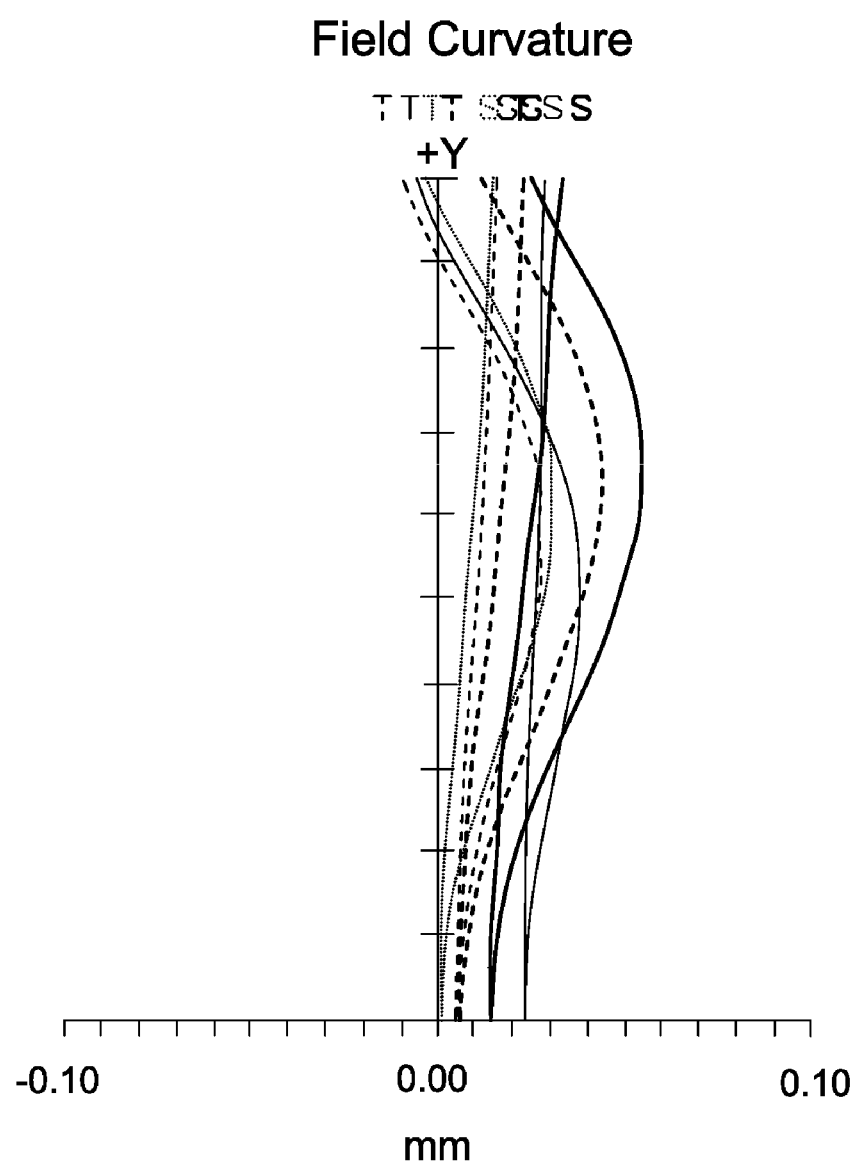
FIG. 8A depicts a field curvature diagram of the lens assembly in accordance with the fifth embodiment of the invention.
Figure 8B:
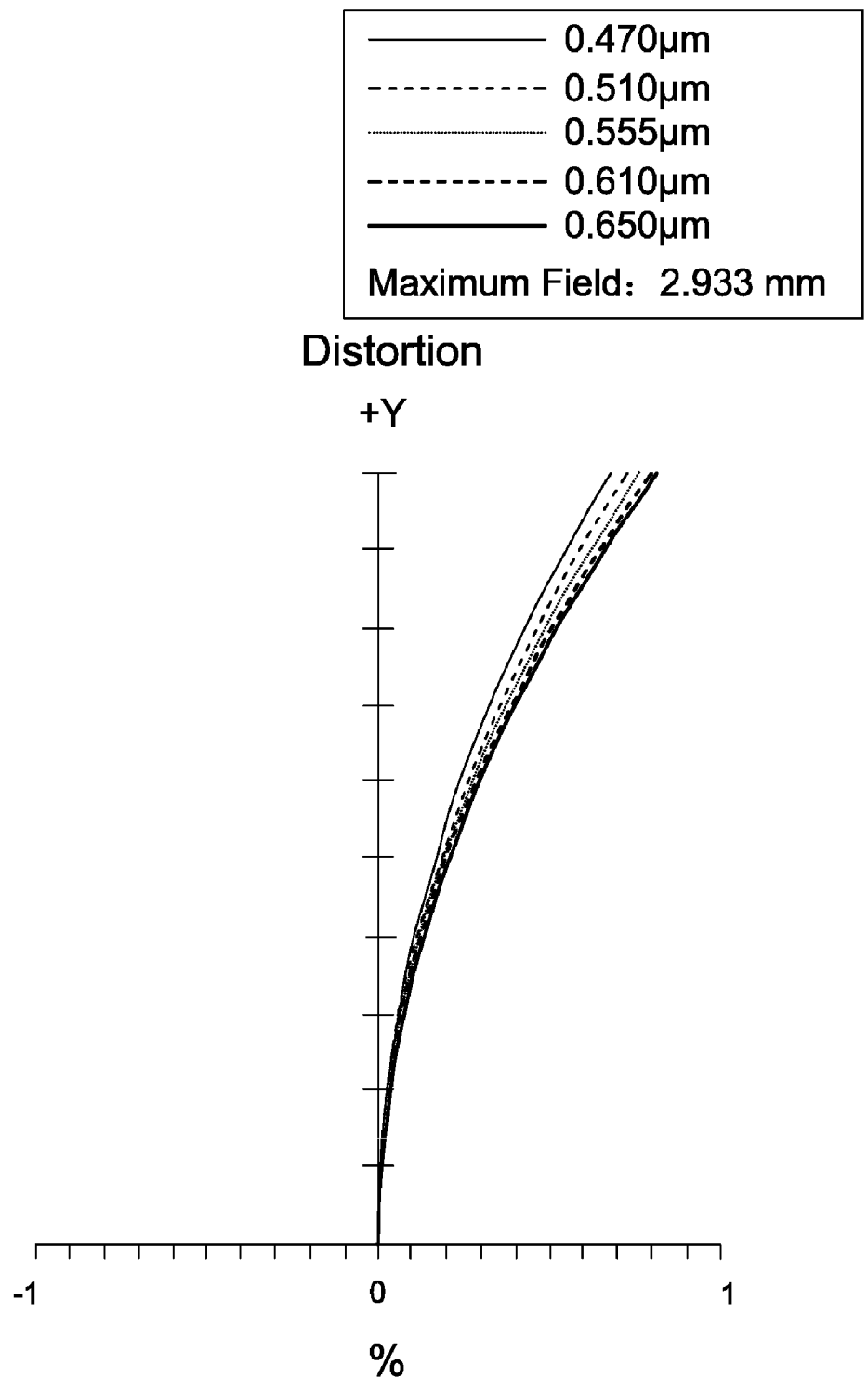
FIG. 8B is a distortion diagram of the lens assembly in accordance with the fifth embodiment of the invention.
Figure 8C:
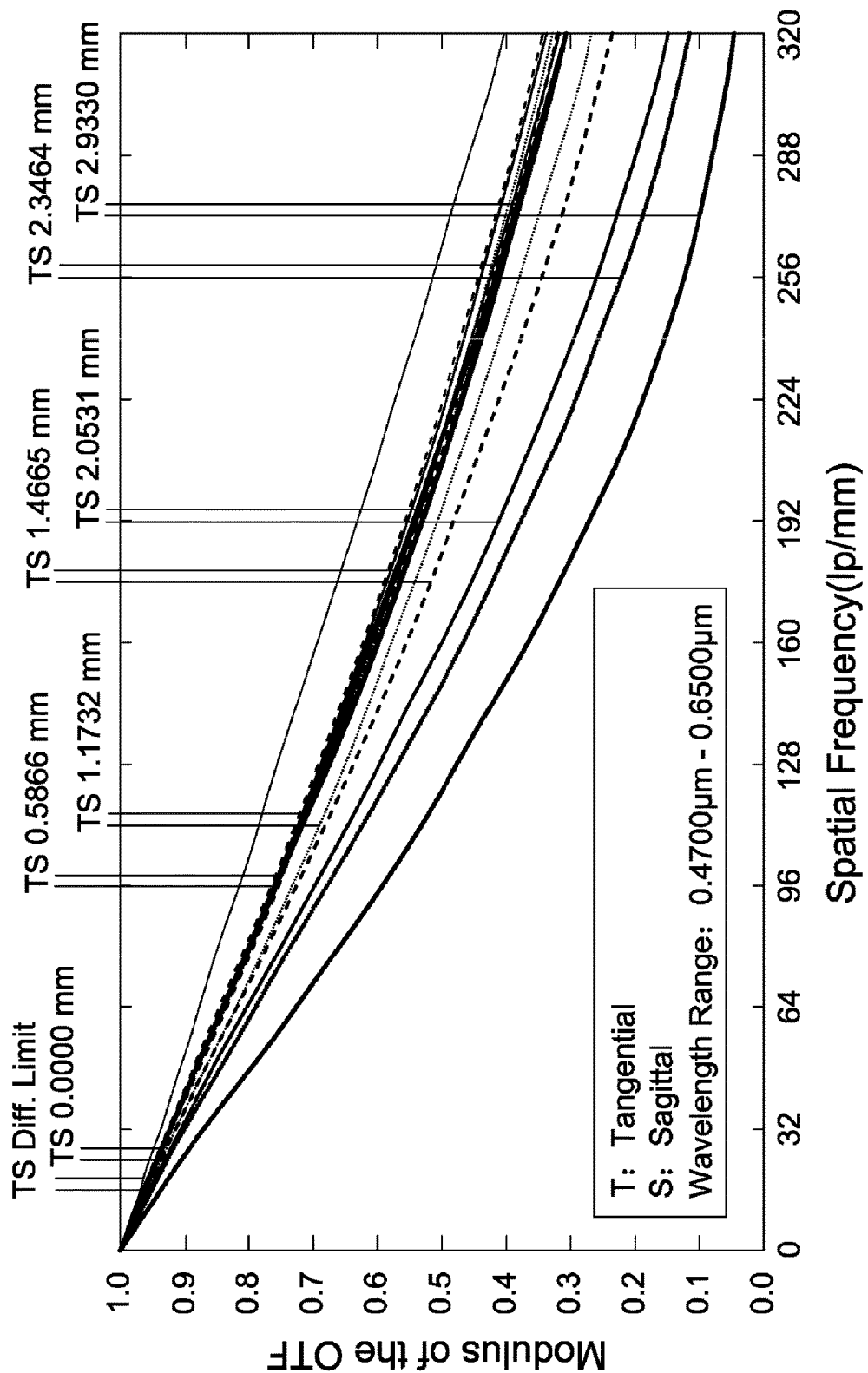
FIG. 8C is a modulation transfer function diagram of the lens assembly in accordance with the fifth embodiment of the invention.

By the above arrangements of the lenses and stop ST7, the lens assembly 7 of the fifth embodiment can meet the requirements of optical performance as seen in FIGS. 8A-8C, wherein FIG. 8A shows a field curvature diagram of the lens assembly 7 in accordance with the fifth embodiment of the invention, FIG. 8B shows a distortion diagram of the lens assembly 7 in accordance with the fifth embodiment of the invention, and FIG. 8C shows a modulation transfer function diagram of the lens assembly 7 in accordance with the fifth embodiment of the invention.

It can be seen from FIG. 8A that the field curvature of tangential direction and sagittal direction in the lens assembly 7 of the fifth embodiment ranges from −0.01 mm to 0.06 mm for the wavelength of 0.470 μm, 0.510 μm, 0.555 μm, 0.610 μm, and 0.650 μm.

It can be seen from FIG. 8B that the distortion in the lens assembly 7 of the fifth embodiment ranges from 0.0% to 0.8% for the wavelength of 0.470 μm, 0.510 μm, 0.555 μm, 0.610 μm, and 0.650 μm.

It can be seen from FIG. 8C that the modulation transfer function of tangential direction and sagittal direction in the lens assembly 7 of the fifth embodiment ranges from 0.05 to 1.0 wherein the wavelength ranges from 0.4700 μm to 0.6500 μm, the fields respectively are 0.0000 mm, 0.5866 mm, 1.1732 mm, 1.4665 mm, 2.0531 mm, 2.3464 mm, and 2.9330 mm, and the spatial frequency ranges from 0 lp/mm to 320 lp/mm.

It is obvious that the field curvature and the distortion of the lens assembly 7 of the fifth embodiment can be corrected effectively, and the resolution of the lens assembly 7 of the fifth embodiment can meet the requirement. Therefore, the lens assembly 7 of the fifth embodiment is capable of good optical performance.

Figure 9:
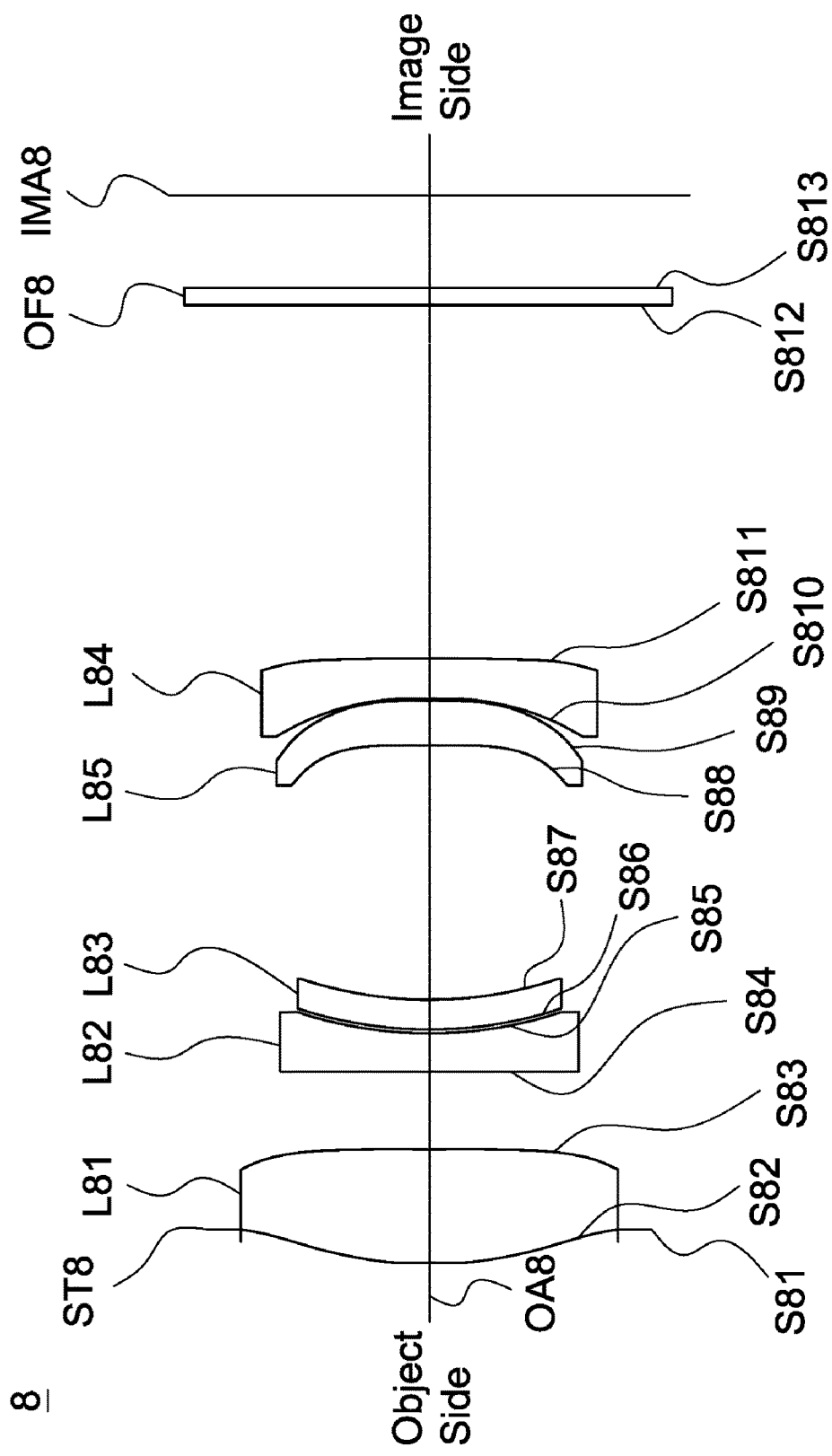
FIG. 9 is a lens layout diagram of a lens assembly in accordance with a sixth embodiment of the invention.

Referring to FIG. 9, FIG. 9 is a lens layout diagram of a lens assembly in accordance with a sixth embodiment of the invention. The lens assembly 8 includes a stop ST8, a first lens L81, a second lens L82, a third lens L83, a fifth lens L85, a fourth lens L84, and an optical filter OF8, all of which are arranged in order from an object side to an image side along an optical axis OA8. In operation, an image of light rays from the object side is formed at an image plane IMA8.

The first lens L81 is a biconvex lens with positive refractive power and made of glass material, wherein the object side surface S82 is a convex surface, the image side surface S83 is a convex surface, and both of the object side surface S82 and image side surface S83 are aspheric surfaces.

The second lens L82 is a biconcave lens with negative refractive power and made of glass material, wherein the object side surface S84 is a concave surface, the image side surface S85 is a concave surface, and both of the object side surface S84 and image side surface S85 are aspheric surfaces.

The third lens L83 is a meniscus lens with positive refractive power and made of glass material, wherein the object side surface S86 is a convex surface, the image side surface S87 is a concave surface, and both of the object side surface S86 and image side surface S87 are aspheric surfaces.

The fifth lens L85 is a meniscus lens with positive refractive power and made of glass material, wherein the object side surface S88 is a concave surface, the image side surface S89 is a convex surface, and both of the object side surface S88 and image side surface S89 are aspheric surfaces.

The fourth lens L84 is a meniscus lens with negative refractive power and made of glass material, wherein the object side surface S810 is a concave surface, the image side surface S811 is a convex surface, and both of the object side surface S810 and image side surface S811 are aspheric surfaces.

Both of the object side surface S812 and image side surface S813 of the optical filter OF8 are plane surfaces.

In order to maintain excellent optical performance of the lens assembly in accordance with the sixth embodiment of the invention, the lens assembly 8 satisfies at least one of the following conditions:

$$R8_{41}/R8_{11}<0 \quad (44)$$

$$(f8_1+f8_3)/f8_2<0 \quad (45)$$

$$f8_{2354}<0 \quad (46)$$

$$TC8_{23}<TTL8/5 \quad (47)$$

$$0.6<SL8/TTL8<1.1 \quad (48)$$

$$0.2<D8_4/TTL8<0.6 \quad (49)$$

$$1<f8/TTL8<1.5 \quad (50)$$

$$0.07<(TC8_{12}+TC8_{23})/TTL8<0.25 \quad (51)$$

The definition of $f8_1$, $f8_2$, $f8_3$, $f8_{2354}$, $R8_{11}$, $R8_{41}$, SL8, TTL8, $D8_4$, f8, $TC8_{12}$, and $TC8_{23}$ are the same as that of $f6_1$, $f6_2$, $f6_3$, $f6_{2354}$, $R6_{11}$, $R6_{41}$, SL6, TTL6, $D6_4$, f6, $TC6_{12}$, and $TC6_{23}$ in the fourth embodiment, and is not described here again.

By the above design of the lenses, stop ST8, and satisfies at least one of the conditions (44)-(51), the lens assembly 8 is provided with an effective shortened total lens length, an effective corrected aberration, and an increased resolution.

In order to achieve the above purposes and effectively enhance the optical performance, the lens assembly 8 in accordance with the sixth embodiment of the invention is provided with the optical specifications shown in Table 16, which include the effective focal length, F-number, total lens length, field of view, radius of curvature of each lens surface, thickness between adjacent surface, refractive index of each lens and Abbe number of each lens. Table 16 shows that the effective focal length is equal to 14.4731 mm, F-number is equal to 3.4, total lens length is equal to 12.121364 mm, and field of view is equal to 23 degrees for the lens assembly 8 of the sixth embodiment of the invention.

TABLE 16

| Surface Number | Radius of Curvature (mm) | Thickness (mm) | Nd | Vd | Remark |
|---|---|---|---|---|---|
| S81 | ∞ | −0.39461 | | | Stop ST8 |
| S82 | 4.182851 | 1.305541 | 1.6779 | 55.34 | The First Lens L81 |
| S83 | −189.472 | 0.866264 | | | |
| S84 | −520.491 | 0.448688 | 1.651 | 21.5 | The Second Lens L82 |
| S85 | 5.196072 | 0.03 | | | |
| S86 | 4.817024 | 0.348291 | 1.535037 | 55.71072 | The Third Lens L83 |
| S87 | 5.244093 | 2.880432 | | | |
| S88 | −11.7543 | 0.521404 | 1.651 | 21.5 | The Fifth Lens L85 |
| S89 | −4.42709 | 0.033187 | | | |
| S810 | −3.48502 | 0.445388 | 1.535037 | 55.71072 | The Fourth Lens L84 |
| S811 | −32.3932 | 4 | | | |
| S812 | ∞ | 0.21 | 1.5168 | 64.16734 | Optical Filter OF8 |
| S813 | ∞ | 1.032169 | | | |

Effective Focal Length = 14.4731 mm
F-number = 3.4
Total Lens Length = 12.121364 mm
Field of View = 23 Degrees The aspheric surface sag z of each lens in table 16 can be calculated by the following formula:

$$z=ch^2/\{1+[1-(k+1)c^2h^2]^{1/2}\}+Ah^4+Bh^6+Ch^8+Dh^{10}+Eh^{12}+Fh^{14}+Gh^{16}$$

where c is curvature, h is the vertical distance from the lens surface to the optical axis, k is conic constant and A, B, C, D, E, F and G are aspheric coefficients.

In the sixth embodiment, the conic constant k and the aspheric coefficients A, B, C, D, E, F, G of each surface are shown in Table 17.

TABLE 17

| Surface Number | k | A | B | C |
|---|---|---|---|---|
| S82 | −0.91178 | −0.001908195 | −0.00044441 | −0.000118424 |
| S83 | 0 | −0.006236552 | −0.001008388 | 5.99307E−05 |
| S84 | 0 | −0.00031453 | 0.000252136 | −0.000206909 |
| S85 | −0.52532 | 0.002165226 | −0.000742138 | 0.000754809 |
| S86 | 0.251367 | 7.13773E−05 | 0.000222967 | 8.35238E−05 |
| S87 | 1.013635 | 0.003005736 | 0.000605258 | 0.000458801 |
| S88 | 35.1475 | −0.026059352 | −0.004871925 | −0.001115304 |
| S89 | −0.26588 | −0.006894999 | −0.011155082 | −0.000546969 |
| S810 | −18.7616 | −0.031824214 | 0.006665636 | −0.000473504 |
| S811 | −100 | −0.010722656 | 0.00338019 | −0.000671632 |

TABLE 17-continued

| Surface Number | D | E | F | G |
|---|---|---|---|---|
| S82 | 6.92451E−06 | 4.46488E−08 | −9.09784E−08 | 1.42064E−08 |
| S83 | 6.49284E−06 | 8.91079E−07 | 3.69358E−07 | 3.98741E−08 |
| S84 | 4.31574E−05 | 1.37856E−05 | 1.17901E−05 | 2.54327E−06 |
| S85 | −0.000641469 | 0.000111183 | 9.95407E−05 | −1.31862E−05 |
| S86 | 7.91762E−05 | 6.94939E−05 | 2.53607E−05 | 5.57199E−6 |
| S87 | 0.000168928 | 8.56832E−06 | 1.85998E−05 | 5.77384E−06 |
| S88 | −0.001070351 | −0.000144434 | 7.27124E−05 | 1.47389E−05 |
| S89 | 3.43412E−05 | 2.24487E−05 | 3.63356E−07 | 6.23723E−06 |
| S810 | −0.000588546 | 4.61656E−05 | 5.16E−05 | 5.60903E−06 |
| S811 | 9.06161E−05 | 2.78E−05 | 1.16E−05 | 3.60348E−06 |

Table 18 shows the parameters and condition values for conditions (44)-(51). As can be seen from Table 18, the lens assembly 8 of the sixth embodiment satisfies the conditions (44)-(51).

TABLE 18

| | | | | | |
|---|---|---|---|---|---|
| $R8_{11}$ | 4.182851 mm | $R8_{41}$ | −3.48502 mm | $f8_1$ | 1.4174 mm |
| $f8_2$ | −2.295 mm | $f8_3$ | 28.81 mm | $f8_{2354}$ | −5.609 mm |
| TTL8 | 12.121364 mm | SL8 | 11.726754 mm | $D8_4$ | 3.782 mm |
| f8 | 14.4731 mm | $TC8_{12}$ | 0.866264 mm | $TC8_{23}$ | 0.03 mm |
| $R8_{41}/R8_{11}$ | −0.833 | $(f8_1 + f8_3)/f8_2$ | −13.171 | SL8/TTL8 | 0.967 |
| $D8_4/TTL8$ | 0.312 | f8/TTL8 | 1.194 | $(TC8_{12} + TC8_{23})/TTL8$ | 0.074 |
| TTL8/5 | 2.424 mm | | | | |

Figure 10A:
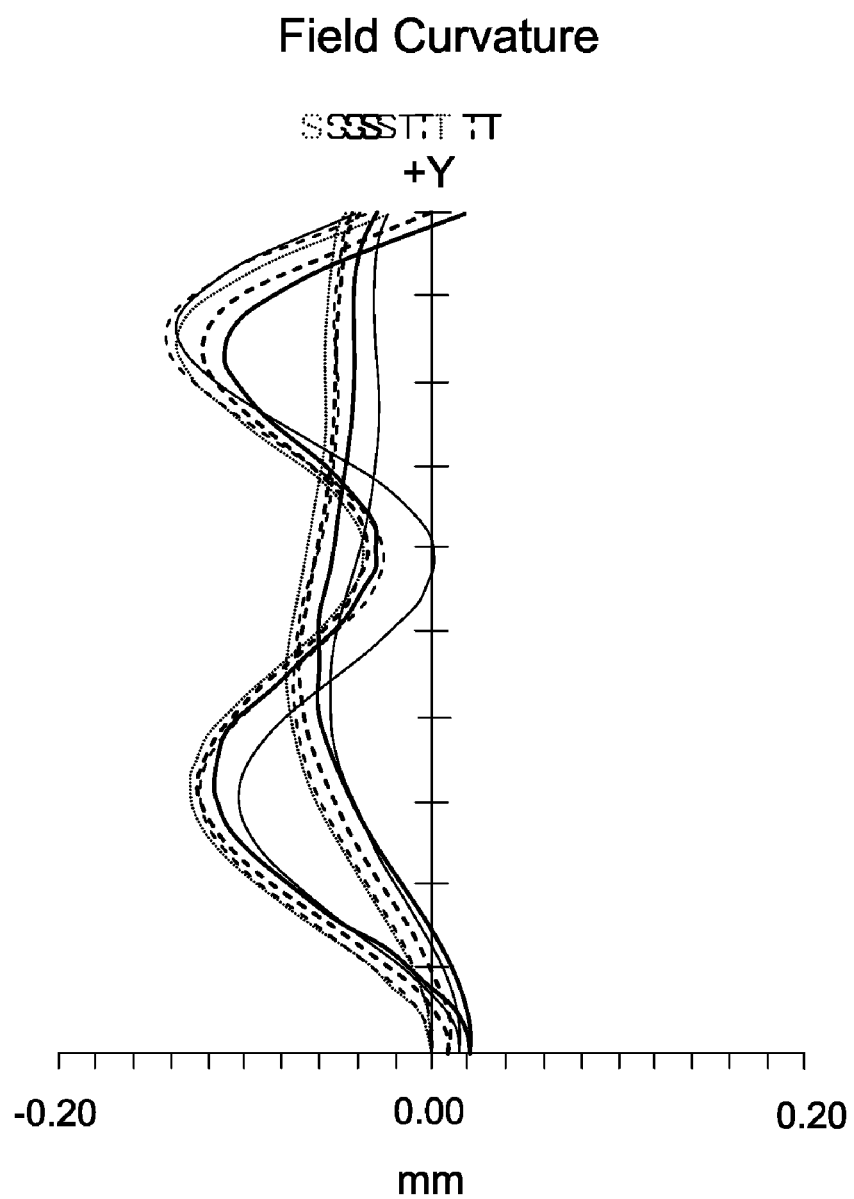
FIG. 10A depicts a field curvature diagram of the lens assembly in accordance with the sixth embodiment of the invention.
Figure 10B:
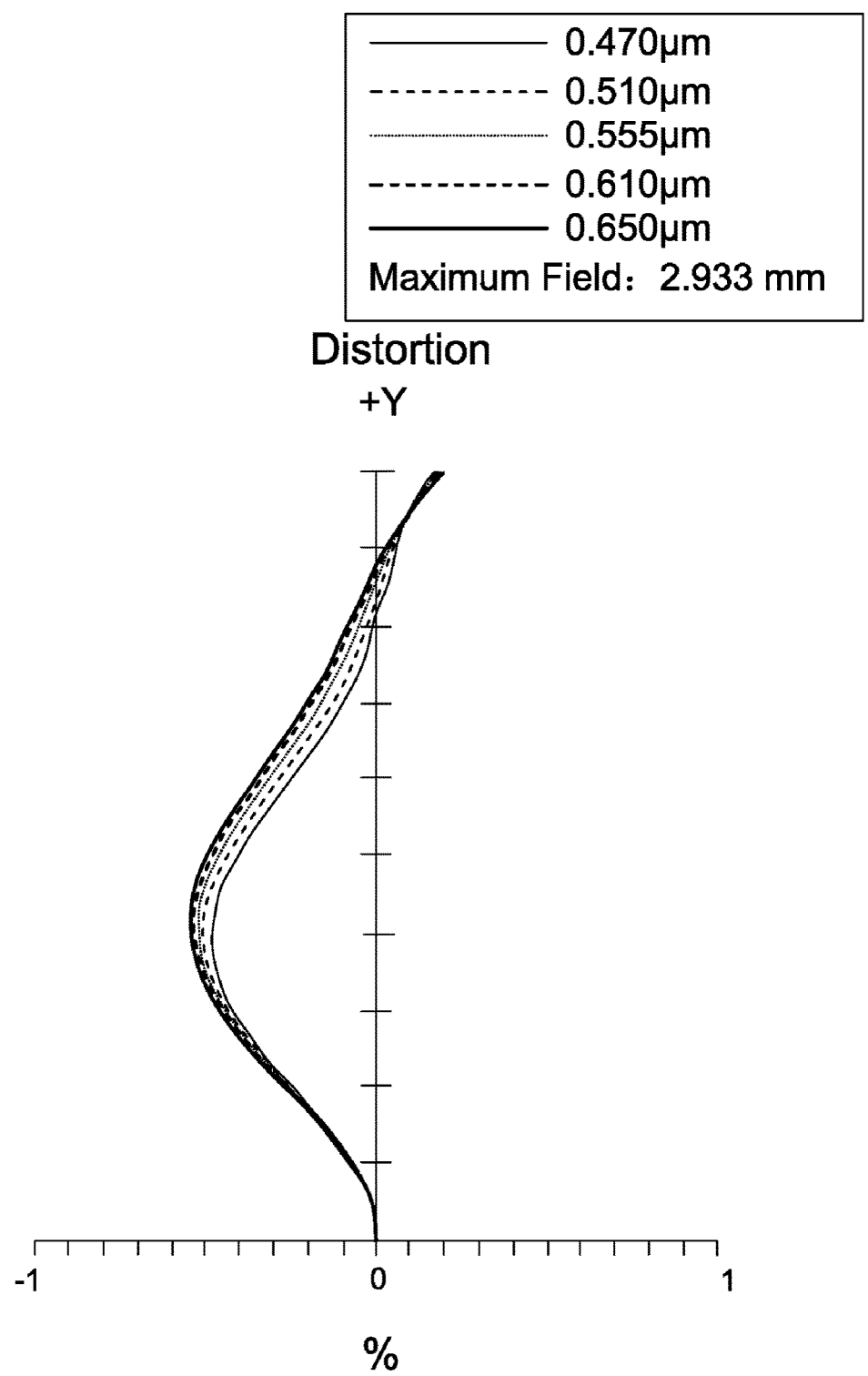
FIG. 10B is a distortion diagram of the lens assembly in accordance with the sixth embodiment of the invention.
Figure 10C:
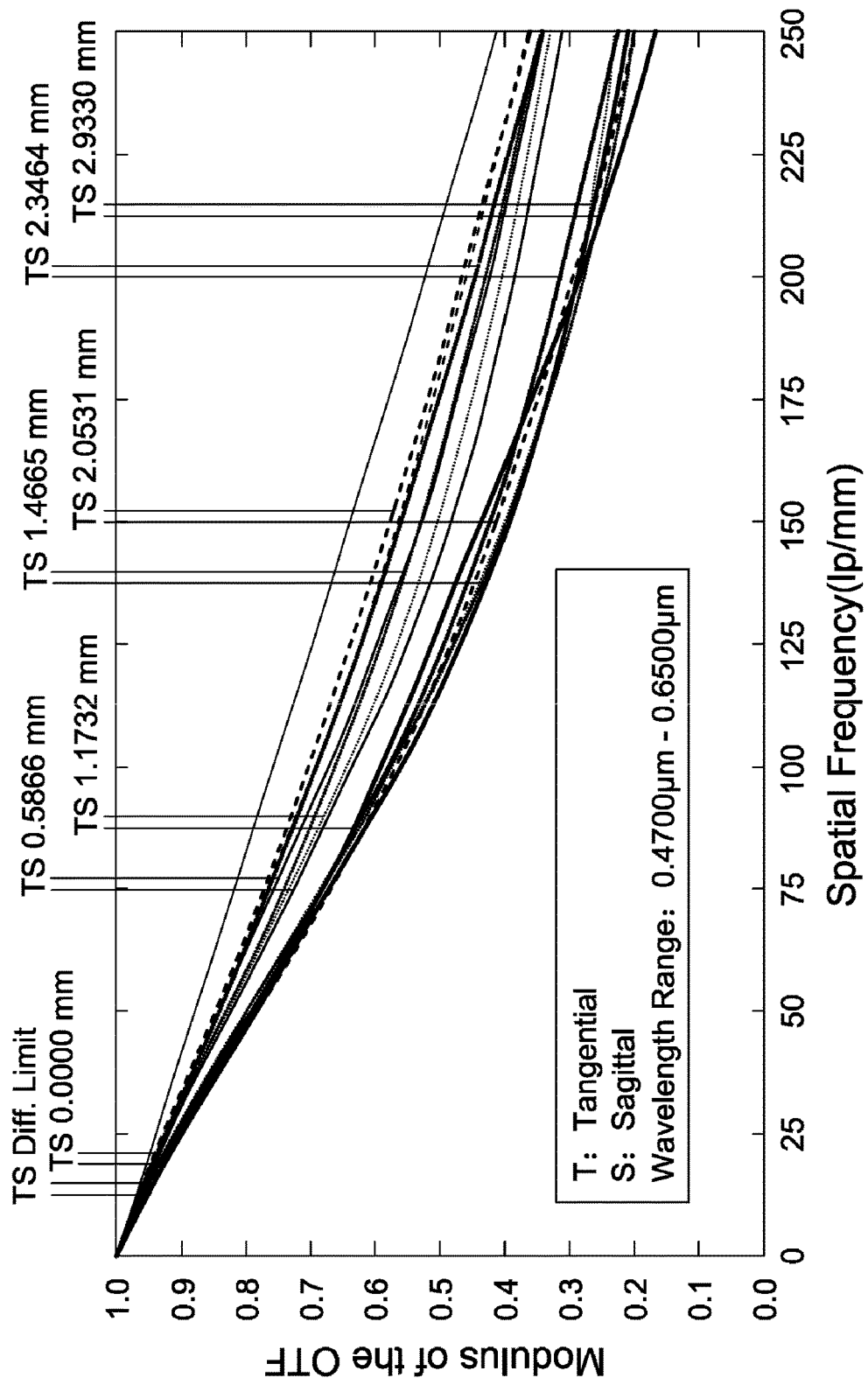
FIG. 10C is a modulation transfer function diagram of the lens assembly in accordance with the sixth embodiment of the invention.

By the above arrangements of the lenses and stop ST8, the lens assembly 8 of the sixth embodiment can meet the requirements of optical performance as seen in FIGS. 10A-10C, wherein FIG. 10A shows a field curvature diagram of the lens assembly 8 in accordance with the sixth embodiment of the invention, FIG. 10B shows a distortion diagram of the lens assembly 8 in accordance with the sixth embodiment of the invention, and FIG. 10C shows a modulation transfer function diagram of the lens assembly 8 in accordance with the sixth embodiment of the invention.

It can be seen from FIG. 10A that the field curvature of tangential direction and sagittal direction in the lens assembly 8 of the sixth embodiment ranges from −0.14 mm to 0.02 mm for the wavelength of 0.470 μm, 0.510 μm, 0.555 μm, 0.610 μm, and 0.650 μm.

It can be seen from FIG. 10B that the distortion in the lens assembly 8 of the sixth embodiment ranges from −0.6% to 0.2% for the wavelength of 0.470 μm, 0.510 μm, 0.555 μm, 0.610 μm, and 0.650 μm.

It can be seen from FIG. 10C that the modulation transfer function of tangential direction and sagittal direction in the lens assembly 8 of the sixth embodiment ranges from 0.18 to 1.0 wherein the wavelength ranges from 0.4700 μm to 0.6500 μm, the fields respectively are 0.0000 mm, 0.5866 mm, 1.1732 mm, 1.4665 mm, 2.0531 mm, 2.3464 mm, and 2.9330 mm, and the spatial frequency ranges from 0 lp/mm to 250 lp/mm.

It is obvious that the field curvature and the distortion of the lens assembly 8 of the sixth embodiment can be corrected effectively, and the resolution of the lens assembly 8 of the sixth embodiment can meet the requirement. Therefore, the lens assembly 8 of the sixth embodiment is capable of good optical performance.

Referring to Table 19 and Table 20, Table 19 provides optical specifications in accordance with a seventh embodiment of the invention; Table 20 provides aspheric coefficients of each surface in Table 19.

The figure which depicts the lens layout diagram of the lens assembly in accordance with the seventh embodiment of the invention is similar to the figure which depicts the lens layout diagram of the lens assembly in accordance with the sixth embodiment of the invention, thus the figure which depicts the lens layout diagram of the lens assembly in accordance with the seventh embodiment of the invention is omitted.

Table 19 shows that the effective focal length is equal to 8.299 mm, F-number is equal to 2.8, total lens length is equal to 6.340399 mm, and field of view is equal to 35.4 degrees for the lens assembly of the seventh embodiment of the invention.

TABLE 19

| Surface Number | Radius of Curvature (mm) | Thickness (mm) | Nd | Vd | Remark |
|---|---|---|---|---|---|
| S91 | ∞ | 0 | | | Stop ST9 |
| S92 | 1.55658 | 1.416629 | 1.48518 | 56.1003 | The First Lens L91 |
| S93 | −8.30303 | 0.032574 | | | |
| S94 | −45.2809 | 0.25 | 1.66059 | 20.40123 | The Second Lens L92 |
| S95 | 8.825224 | 0.483442 | | | |
| S96 | 325.2802 | 0.246758 | 2.0018 | 19.32111 | The Third Lens L93 |
| S97 | 3.422842 | 1.07513 | | | |
| S98 | −7.65635 | 0.789702 | 1.66059 | 20.40123 | The Fifth Lens L95 |
| S99 | −1.35298 | 0.024355 | | | |

TABLE 19-continued

| Surface Number | Radius of Curvature (mm) | Thickness (mm) | Nd | Vd | Remark |
|---|---|---|---|---|---|
| S910 | −1.13915 | 0.244 | 1.87701 | 40.00308 | The Fourth Lens L94 |
| S911 | −4.32779 | 0.67 | | | |
| S912 | ∞ | 0.21 | 1.5168 | 64.16734 | Optical Filter OF9 |
| S913 | ∞ | 0.897809 | | | |

Effective Focal Length = 8.299 mm
F-number = 2.8
Total Lens Length = 6.340399 mm
Field of View = 35.4 Degrees The aspheric surface sag z of each lens in table 19 can be calculated by the following formula:

$$z=ch^2/\{1+[1-(k+1)c^2h^2]^{1/2}\}+Ah^4+Bh^6+Ch^8+Dh^{10}+Eh^{12}+Fh^{14}+Gh^{16}$$

where c is curvature, h is the vertical distance from the lens surface to the optical axis, k is conic constant and A, B, C, D, E, F and G are aspheric coefficients.

In the seventh embodiment, the conic constant k and the aspheric coefficients A, B, C, D, E, F, G of each surface are shown in Table 20.

TABLE 20

| Surface Number | k | A | B | C |
|---|---|---|---|---|
| S92 | −0.18691 | −0.004967892 | 0.003691487 | −0.002762565 |
| S93 | 0 | 0.030434606 | −0.006905411 | −0.001492041 |
| S94 | 0 | −0.021368719 | 0.012539298 | −0.001093004 |
| S95 | −215.26 | −0.029533849 | 0.003159611 | −0.005360819 |
| S96 | −2204441 | 0.025395561 | 0.038383065 | −0.091685618 |
| S97 | 11.63239 | 0.053924862 | 0.17926824 | −0.55237348 |
| S98 | 39.50452 | −0.050516792 | −0.082589317 | 0.069785576 |
| S99 | −0.54339 | −0.074617694 | 0.042373677 | 0.017540681 |
| S910 | −2.88299 | −0.10499084 | 0.11567057 | −0.011457393 |
| S911 | 0 | 0.048491682 | −0.011887514 | −0.010005116 |

| Surface Number | D | E | F | G |
|---|---|---|---|---|
| S92 | −0.000308727 | 0.000343666 | 0.000198659 | −0.000123543 |
| S93 | 0.002626201 | −0.001512125 | −0.001707722 | 0.001145666 |
| S94 | −0.005373573 | 0.000122147 | 0.001409709 | 3.47271E−05 |
| S95 | 0.009560143 | −0.003765283 | −0.001092351 | 0.001044718 |
| S96 | −0.018342664 | 0.69478028 | −1.2843946 | 0.70074574 |
| S97 | 0.97136337 | 0.69237483 | −2.8802972 | 1.6662102 |
| S98 | −0.010739466 | 0.006071789 | 0.009375601 | −0.003532232 |
| S99 | −0.008075551 | −0.022775955 | −0.005255464 | 0.010551663 |
| S910 | −0.042291227 | 0.002272883 | 5.59E−03 | 0.000245446 |
| S911 | 0.004665908 | −3.21E−04 | −3.40E−04 | 8.27339E−05 |

In order to maintain excellent optical performance of the lens assembly in accordance with the seventh embodiment of the invention, the lens assembly satisfies at least one of the following conditions:

$$R9_{41}/R9_{11}<0 \quad (52)$$

$$(f9_1+f9_3)/f9_2<0 \quad (53)$$

$$f9_{2354}<0 \quad (54)$$

$$TC9_{23}<TTL9/5 \quad (55)$$

$$0.6<SL9/TTL9<1.1 \quad (56)$$

$$0.2<D9_4/TTL9<0.6 \quad (57)$$

$$1<f9/TTL9<1.5 \quad (58)$$

$$0.07<(TC9_{12}+TC9_{23})/TTL9<0.25 \quad (59)$$

The definition of $f9_1$, $f9_2$, $f9_3$, $f9_{2354}$, $R9_{ii}$, $R9_{41}$, SL9, TTL9, $D9_4$, f9, $TC9_{12}$, and $TC9_{23}$ are the same as that of $f6_1$, $f6_2$, $f6_3$, $f6_{2354}$, $R6_{11}$, $R6_{41}$, SL6, TTL6, $D6_4$, f6, $TC6_{12}$, and $TC6_{23}$ in the fourth embodiment, and is not described here again.

By the above design of the lenses, stop ST9, and satisfies at least one of the conditions (52)-(59), the lens assembly is provided with an effective shortened total lens length, an effective corrected aberration, and an increased resolution.

Table 21 shows the parameters and condition values for conditions (52)-(59). As can be seen from Table 21, the lens assembly of the seventh embodiment satisfies the conditions (52) and (54)-(59).

TABLE 21

| $R9_{11}$ | 1.55658 mm | $R9_{41}$ | −1.13915 mm | $f9_1$ | 2.8259 mm |
|---|---|---|---|---|---|
| $f9_2$ | −11.064 mm | $f9_3$ | −3.4225 mm | $f9_{2354}$ | −1.58326 mm |

TABLE 21-continued

| TTL9 | 6.340399 mm | SL9 | 5.491 mm | $D9_4$ | 3.16439 mm |
|---|---|---|---|---|---|
| f9 | 8.299 mm | $TC9_{12}$ | 0.032574 mm | $TC9_{23}$ | 0.483442 mm |
| $R9_{41}/R9_{11}$ | −0.732 | $(f9_1 + f9_3)/f9_2$ | 0.05392 | SL9/TTL9 | 0.86603 |
| $D9_4$/TTL9 | 0.49908 | f9/TTL9 | 1.30891 | $(TC9_{12} + TC9_{23})$/TTL9 | 0.08138 |
| TTL9/5 | 1.26808 mm | | | | |

The field curvature (figure is omitted) and the distortion (figure is omitted) of the lens assembly of the seventh embodiment can be corrected effectively, and the resolution of the lens assembly of the seventh embodiment can meet the requirement. Therefore, the lens assembly of the seventh embodiment is capable of good optical performance.

In the above embodiments, all of the lenses are made of glass material. However, it has the same effect and falls into the scope of the invention that a part or all of the lenses are made of plastic material.

Figure 11:
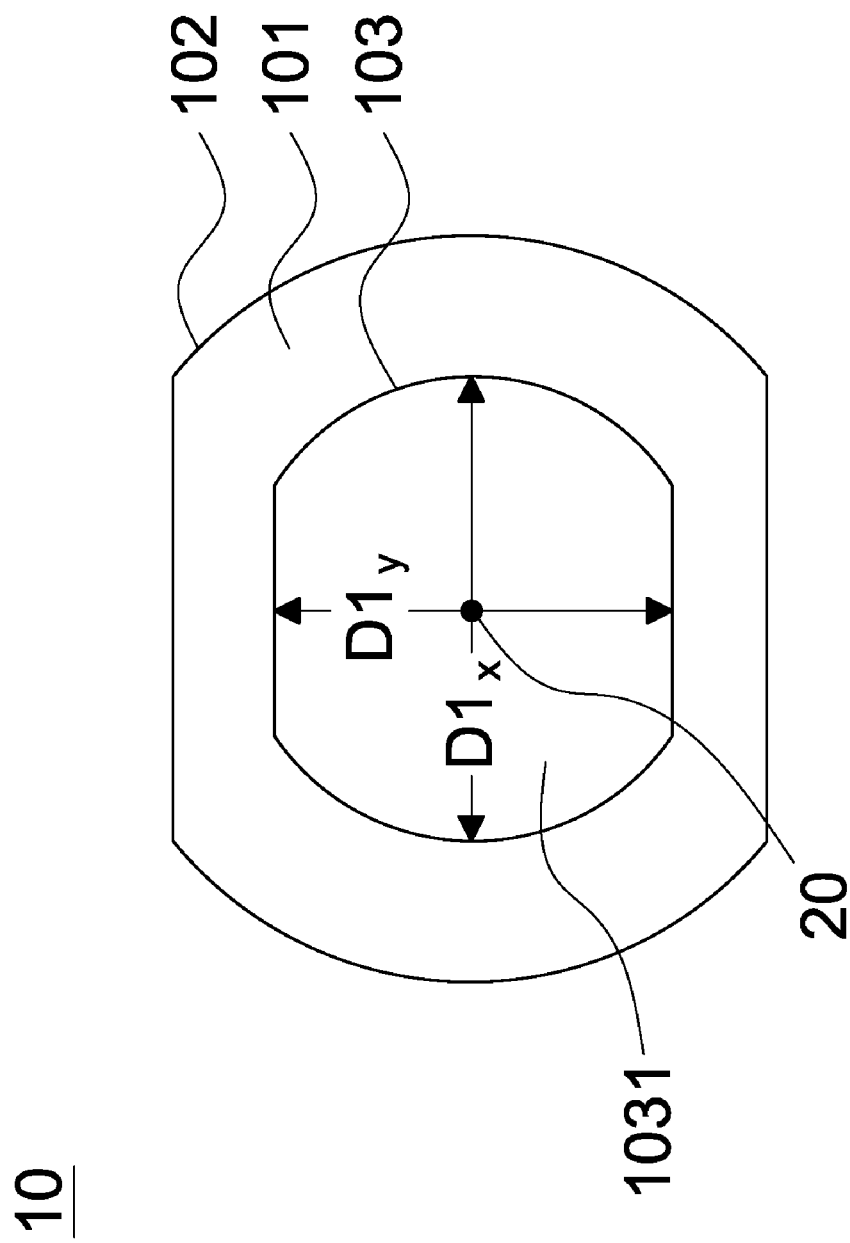
FIG. 11 depicts a non-circular stop in accordance with the invention.
Figure 12:
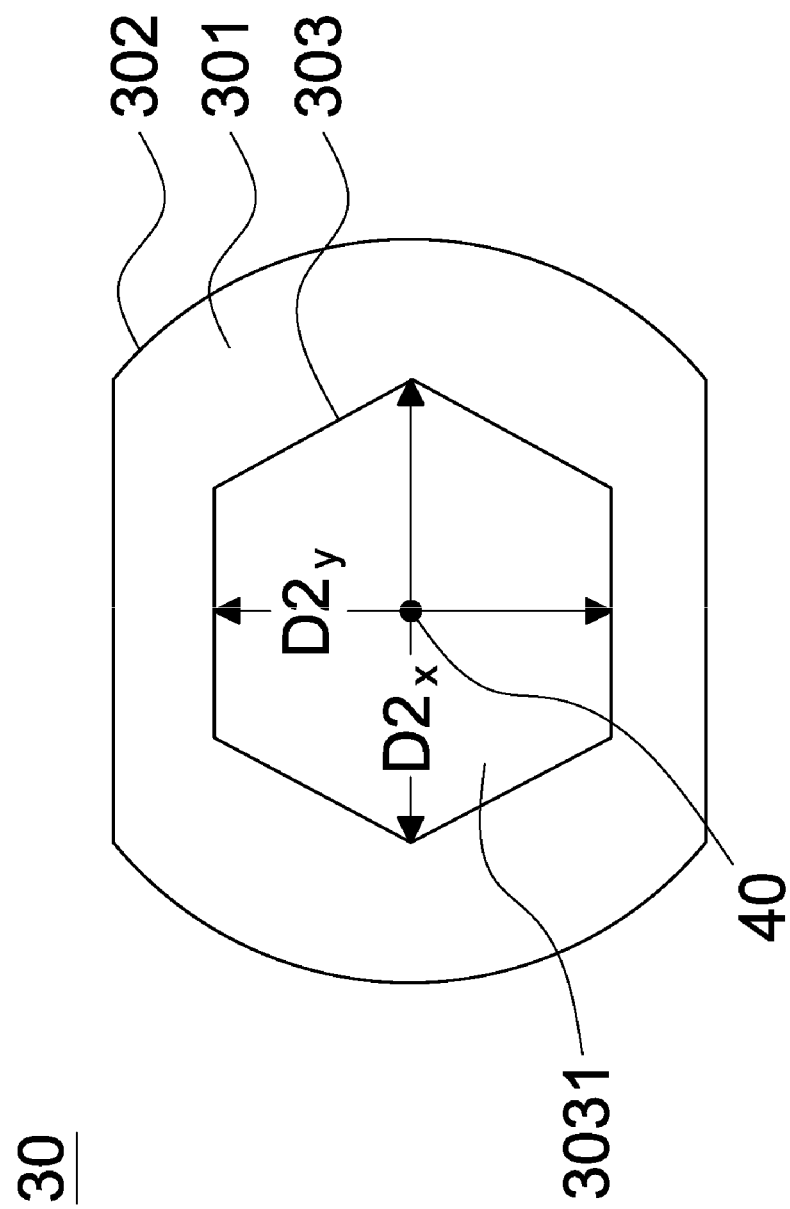
FIG. 12 depicts a non-circular stop in accordance with the invention.

In the above embodiments, all of the stops are circular. However, it has the same effect and falls into the scope of the invention that the stops are modified to non-circular as shown in FIG. 11 and FIG. 12. The non-circular stop shown in FIG. 11 and FIG. 12 will be further described below.

Referring to FIG. 11, FIG. 11 is a non-circular stop diagram in accordance with an embodiment of the invention. The non-circular stop 10 includes an annular main body 101, an outer circumferential portion 102, and an inner circumferential portion 103. The annular main body 101 connects to the outer circumferential portion 102 and the inner circumferential portion 103. The annular main body 101 is disposed between the outer circumferential portion 102 and the inner circumferential portion 103. The outer circumferential portion 102 is non-circular. The inner circumferential portion 103 is non-circular and surrounds an optical axis 20 to form a hole 1031. D1x is a maximum dimension of the hole 1031 defined by the inner circumferential portion 103 through which the optical axis 20 passes and D1y is a minimum dimension of the hole 1031 defined by the inner circumferential portion 103 through which the optical axis 20 passes. The non-circular stop 10 satisfies the following conditions:

$D1x>D1y$, $1<D1x/D1y<28$, $0<(D1x-D1y)/(D1x/2)<2$, $0<(A1_x-\Delta S1)/A1_x<1$, $0<\Delta S1/(D1x/2)<8$, wherein D1x is a maximum dimension of the hole 1031 through which the optical axis 20 passes, and D1y is a minimum dimension of the hole 1031 through which the optical axis 20 passes, $A1_x$ is an area of a circle having a diameter of D1x, and ΔS1 is a difference between the area of the circle having the diameter of D1x and a cross sectional area of the hole 1031.

Referring to FIG. 12, FIG. 12 is a non-circular stop diagram in accordance with an embodiment of the invention. The non-circular stop 30 includes an annular main body 301, an outer circumferential portion 302, and an inner circumferential portion 303. The annular main body 301 connects to the outer circumferential portion 302 and the inner circumferential portion 303. The annular main body 301 is disposed between the outer circumferential portion 302 and the inner circumferential portion 303. The outer circumferential portion 302 is non-circular. The inner circumferential portion 303 is non-circular and surrounds an optical axis 40 to form a hole 3031. D2x is a maximum dimension of the hole 3031 defined by the inner circumferential portion 303 through which the optical axis 40 passes and D2y is a minimum dimension of the hole 3031 defined by the inner circumferential portion 303 through which the optical axis 40 passes. The non-circular stop 30 satisfies the following conditions:

$D2x>D2y$, $1<D2x/D2y<28$, $0<(D2x-D2y)/(D2x/2)<2$, $0<(A2_x-\Delta S2)/A2_x<1$, $0<\Delta S2/(D2x/2)<8$, The definition of D2x, D2y, A2, and ΔS2 are the same as D1x, D1y, $A1_x$, and ΔS1, and is not described here again.

The above non-circular stop 10 and non-circular stop 30 can be disposed between the object side and the second lens.

The above non-circular stop 10 and non-circular stop 30 can be made of metal, polyethylene terephthalate (PET), or manufactured by atomizing, blacking or printing a non-effective-diameter region on any of the lenses.

A reflection device can be further disposed between the above non-circular stop 10 and the object side.

A reflection device can be further disposed between the above non-circular stop 30 and the object side.

The above reflection device is a prism or a reflection mirror.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly comprising:
    a first lens which is with positive refractive power;
    a second lens which is with negative refractive power;
    a third lens which is with refractive power; and
    a fourth lens which is with negative refractive power;
    wherein the first lens, the second lens, the third lens, and the fourth lens are arranged in order from an object side to an image side along an optical axis;
    wherein the lens assembly satisfies:

$0.2<D_4/TTL<0.6$, wherein $D_4$ is an effective diameter of the fourth lens and TTL is an interval from an object side surface of the first lens to an image plane along the optical axis.

2. The lens assembly as claimed in claim 1, further comprising a fifth lens disposed between the third lens and the fourth lens, wherein the fifth lens is with positive refractive power.

3. The lens assembly as claimed in claim 1, wherein the lens assembly satisfies:

$$f_{234}<0,$$

wherein $f_{234}$ is an effective focal length of a combination of the second lens, the third lens, and the fourth lens.

4. The lens assembly as claimed in claim 1, wherein the lens assembly satisfies:

$$TC_{34}<TTL/5,$$

wherein $TC_{34}$ is an air interval from an image side surface of the third lens to an object side surface of the fourth lens along the optical axis and TTL is an interval from an object side surface of the first lens to an image plane along the optical axis.

5. The lens assembly as claimed in claim 1, wherein the lens assembly satisfies:

$$R_{41}/R_{11}<0,$$

wherein $R_{11}$ is a radius of curvature of an object side surface of the first lens and $R_{41}$ is a radius of curvature of an object side surface of the fourth lens.

6. The lens assembly as claimed in claim 1, wherein the lens assembly satisfies:

$$(f_1+f_3)/f_2<0,$$

wherein $f_1$ is an effective focal length of the first lens, $f_2$ is an effective focal length of the second lens, and $f_3$ is an effective focal length of the third lens.

7. The lens assembly as claimed in claim 1, wherein the lens assembly satisfies:

$$TC_{23}<TTL/5,$$

wherein $TC_{23}$ is an air interval from an image side surface of the second lens to an object side surface of the third lens along the optical axis and TTL is an interval from an object side surface of the first lens to an image plane along the optical axis.

8. The lens assembly as claimed in claim 1, further comprising a stop disposed between the object side and the second lens, wherein the lens assembly satisfies:

$$0.6<SL/TTL<1.1,$$

wherein SL is an interval from the stop to an image plane along the optical axis and TTL is an interval from an object side surface of the first lens to the image plane along the optical axis.

9. The lens assembly as claimed in claim 1, further comprising a non-circular stop, wherein the non-circular stop comprises an outer circumferential portion and an inner circumferential portion, at least one of the outer circumferential portion and the inner circumferential portion is non-circular, the inner circumferential portion surrounds the optical axis to form a hole, and the non-circular stop satisfies:

$$1<Dx/Dy<28,$$

wherein Dx is a maximum dimension of the hole through which the optical axis passes and Dy is a minimum dimension of the hole through which the optical axis passes.

10. The lens assembly as claimed in claim 2, wherein the lens assembly satisfies:

$$f_{2354}<0,$$

wherein $f_{2354}$ is an effective focal length of a combination of the second lens, the third lens, the fifth lens, and the fourth lens.

11. The lens assembly as claimed in claim 1, wherein the lens assembly satisfies:

$$0.07<(TC_{12}+TC_{23})/TTL<0.25,$$

wherein $TC_{12}$ is an air interval from an image side surface of the first lens to an object side surface of the second lens along the optical axis, $TC_{23}$ is an air interval from an image side surface of the second lens to an object side surface of the third lens along the optical axis, and TTL is an interval from an object side surface of the first lens to an image plane along the optical axis.

12. A lens assembly comprising:
a first lens which is with positive refractive power;
a second lens which is with negative refractive power;
a third lens which is with refractive power; and
a fourth lens which is with negative refractive power;
wherein the first lens, the second lens, the third lens, and the fourth lens are arranged in order from an object side to an image side along an optical axis;
wherein the lens assembly satisfies:

$$0.07<(TC_{12}+TC_{23})/TTL<0.25,$$

wherein $TC_{12}$ is an air interval from an image side surface of the first lens to an object side surface of the second lens along the optical axis, $TC_{23}$ is an air interval from an image side surface of the second lens to an object side surface of the third lens along the optical axis, and TTL is an interval from an object side surface of the first lens to an image plane along the optical axis.

13. The lens assembly as claimed in claim 12, further comprising a fifth lens disposed between the third lens and the fourth lens, wherein the fifth lens is with positive refractive power.

14. The lens assembly as claimed in claim 12, wherein the lens assembly satisfies:

$$f_{234}<0,$$

wherein $f_{234}$ is an effective focal length of a combination of the second lens, the third lens, and the fourth lens.

15. The lens assembly as claimed in claim 12, wherein the lens assembly satisfies:

$$TC_{34}<TTL/5,$$

wherein $TC_{34}$ is an air interval from an image side surface of the third lens to an object side surface of the fourth lens along the optical axis and TTL is an interval from an object side surface of the first lens to an image plane along the optical axis.

16. The lens assembly as claimed in claim 12, wherein the lens assembly satisfies:

$$R_{41}/R_{11}<0,$$

wherein $R_{11}$ is a radius of curvature of an object side surface of the first lens and $R_{41}$ is a radius of curvature of an object side surface of the fourth lens.

17. The lens assembly as claimed in claim 12, wherein the lens assembly satisfies:

$$(f_1+f_3)/f_2<0,$$

wherein $f_1$ is an effective focal length of the first lens, $f_2$ is an effective focal length of the second lens, and $f_3$ is an effective focal length of the third lens.

18. The lens assembly as claimed in claim 12, further comprising a stop disposed between the object side and the second lens, wherein the lens assembly satisfies:

$$0.6<SL/TTL<1.1,$$

wherein SL is an interval from the stop to an image plane along the optical axis and TTL is an interval from an object side surface of the first lens to the image plane along the optical axis.

19. A lens assembly comprising:
a first lens which is with positive refractive power;
a second lens which is with negative refractive power;
a third lens which is with refractive power; and
a fourth lens which is with negative refractive power;
wherein the first lens, the second lens, the third lens, and the fourth lens are arranged in order from an object side to an image side along an optical axis;
wherein the lens assembly satisfies:

$1 < f/TTL \leq 1.5$, wherein f is an effective focal length of the lens assembly and TTL is an interval from an object side surface of the first lens to an image plane along the optical axis; wherein the lens assembly further comprises a non-circular stop, wherein the non-circular stop comprises an outer circumferential portion and an inner circumferential portion, at least one of the outer circumferential portion and the inner circumferential portion is non-circular, the inner circumferential portion surrounds the optical axis to form a hole, and the non-circular stop satisfies:

$1 < Dx/Dy < 28$, wherein Dx is a maximum dimension of the hole through which the optical axis passes and Dy is a minimum dimension of the hole through which the optical axis passes.

20. The lens assembly as claimed in claim 12, wherein the lens assembly satisfies:

$1 < f/TTL < 1.5$, wherein f is an effective focal length of the lens assembly and TTL is an interval from an object side surface of the first lens to an image plane along the optical axis.

* * * * *